US007466884B2

(12) United States Patent
Beausoleil

(10) Patent No.: US 7,466,884 B2
(45) Date of Patent: Dec. 16, 2008

(54) PHOTONIC-INTERCONNECT SYSTEMS FOR READING DATA FROM MEMORY CELLS AND WRITING DATA TO MEMORY INTEGRATED CIRCUITS

(75) Inventor: Raymond G. Beausoleil, Redmond, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/582,088

(22) Filed: Oct. 17, 2006

(65) Prior Publication Data

US 2008/0089157 A1  Apr. 17, 2008

(51) Int. Cl.
*G02B 6/30* (2006.01)
*H03M 1/22* (2006.01)

(52) U.S. Cl. .............................. 385/49; 385/14; 385/15; 385/31; 385/39; 341/13; 341/14

(58) Field of Classification Search .................... 385/49
See application file for complete search history.

(56) References Cited

U.S. PATENT DOCUMENTS 7,050,659 B1 *  5/2006  Williams et al. ................ 385/5
7,155,078 B2 * 12/2006  Welch et al. ................. 385/14
7,228,016 B2 *  6/2007  Beausoleil .................... 385/12
7,251,386 B1 *  7/2007  Dickinson et al. ............. 385/14
2004/0047569 A1     3/2004  Cochran et al.
2005/0025409 A1 *  2/2005  Welch et al. .................. 385/14
2005/0078902 A1 *  4/2005  Beausoleil et al. ............. 385/1
2006/0056758 A1 *  3/2006  Beausoleil et al. ............ 385/14

FOREIGN PATENT DOCUMENTS

| WO | WO2005/038514 | 4/2005 |
| WO | WO2007087337  | 8/2007 |
| WO | WO2008/048633 | 4/2008 |

* cited by examiner

Primary Examiner—Frank G Font
Assistant Examiner—Ryan Lepisto

(57) ABSTRACT

Various embodiments of the present invention are related to photonic-interconnect systems for reading data from and writing data to memory cells of memory chips at approximately the same time. In one embodiment of the present invention, A photonic-interconnect system comprises a photonic interconnect coupled to a photonic device. The photonic interconnect is coupled to the memory chip and is configured to encode a first data set stored in the memory cells into a first set of electromagnetic signals at approximately the same time, decode a second data set encoded in a second set of electromagnetic signals at approximately the same time, and store the second data set in the memory cells. The photonic device is configured to transmit the first set of electromagnetic signals out from the photonic interconnect and transmit the second set of electromagnetic signals into the photonic interconnect.

9 Claims, 28 Drawing Sheets

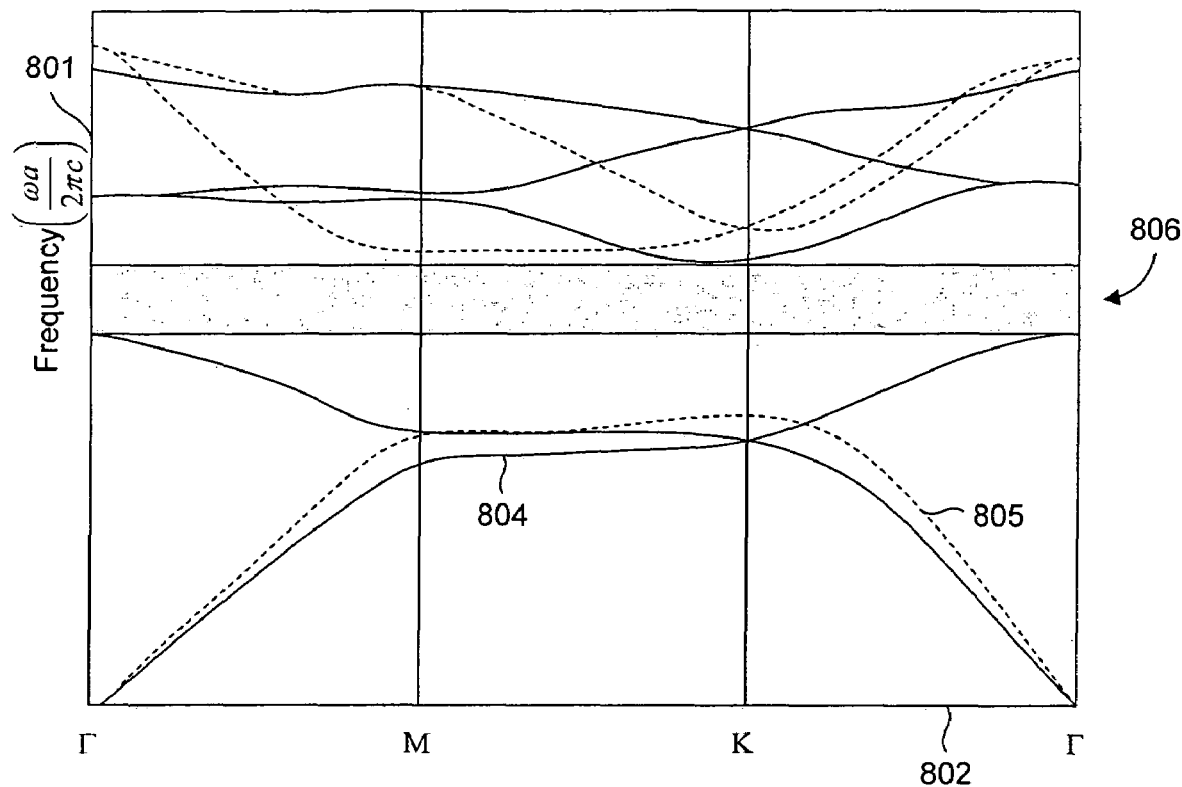
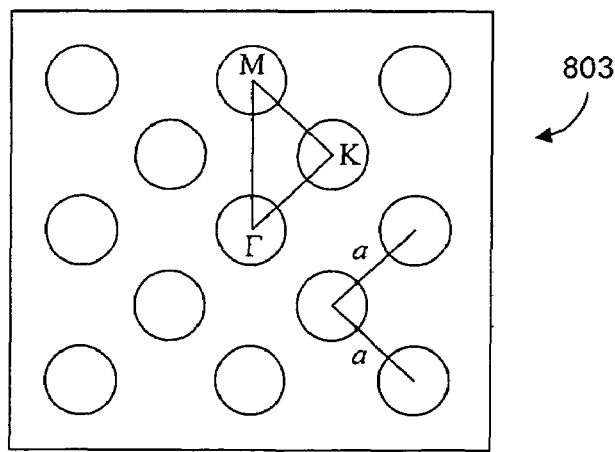
*Figure 8*
-- Prior Art --

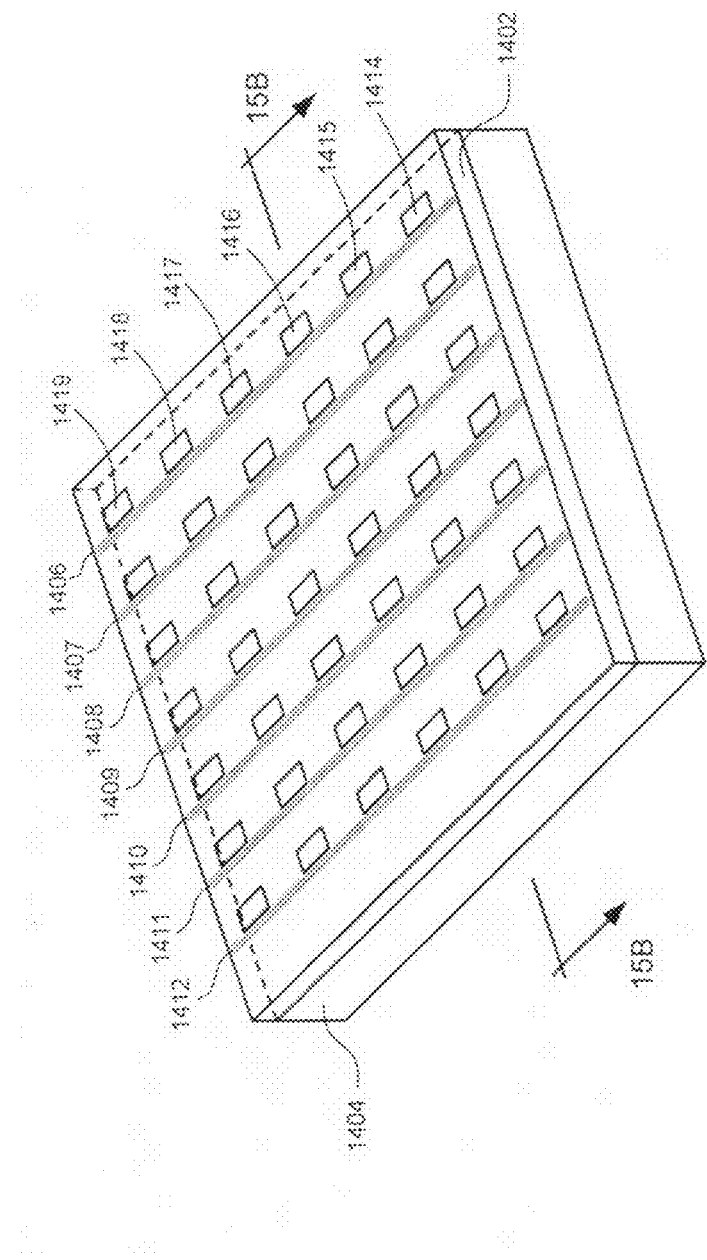
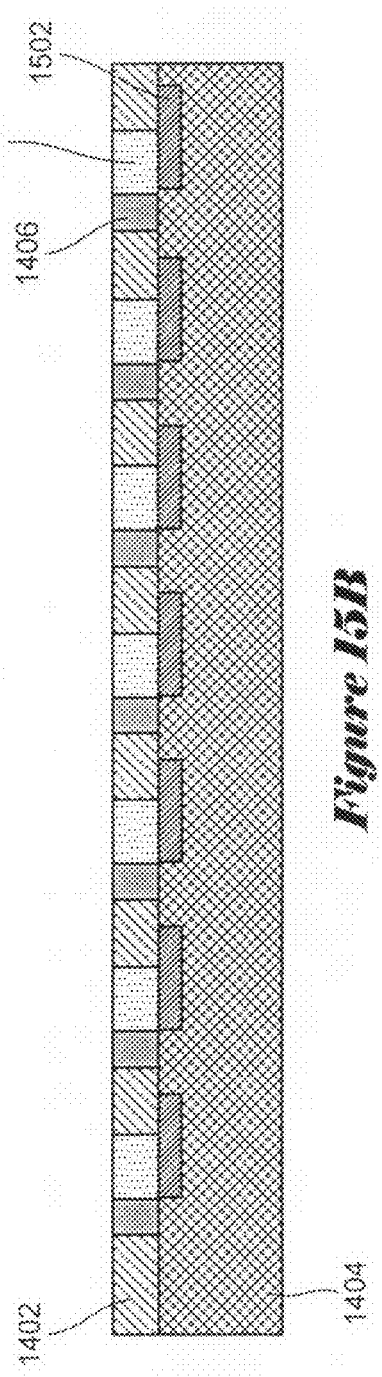
*Figure 15A*
*Figure 15B*

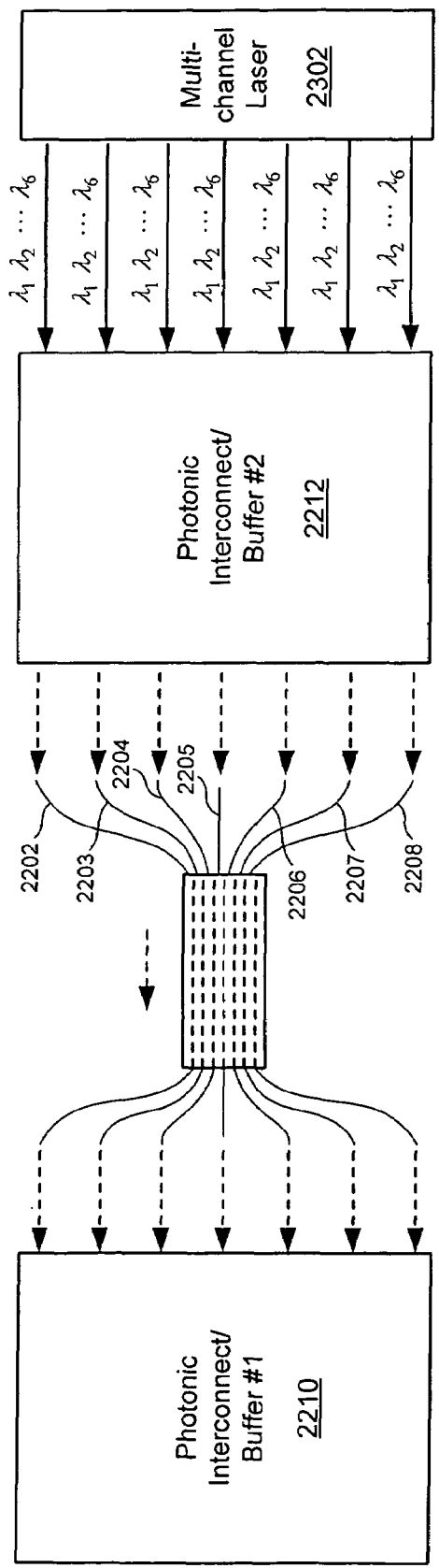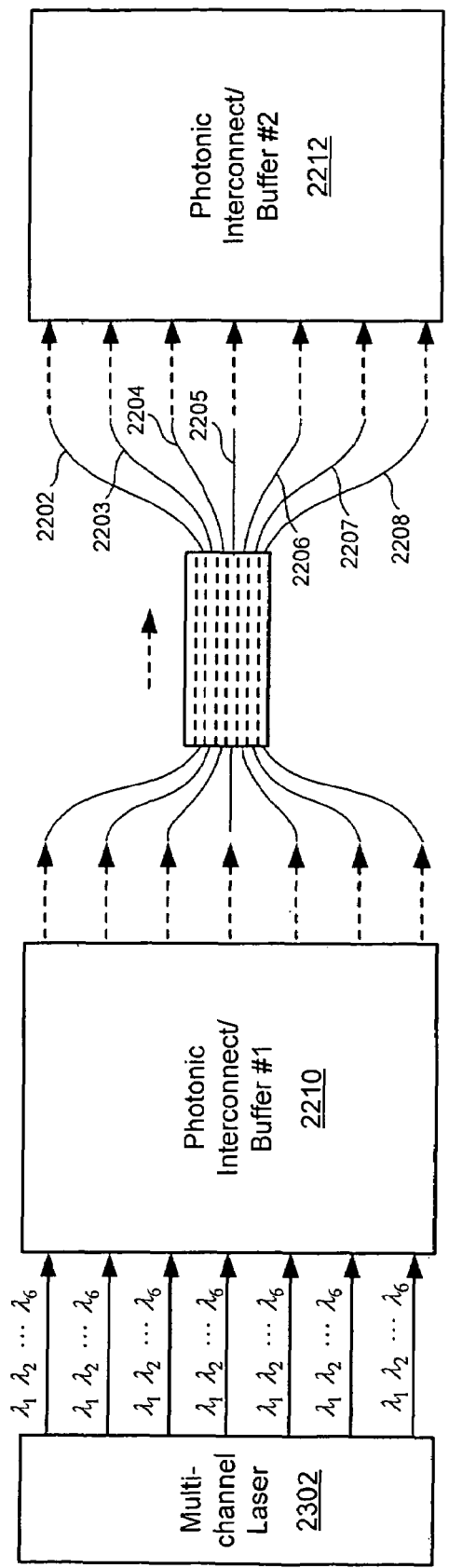

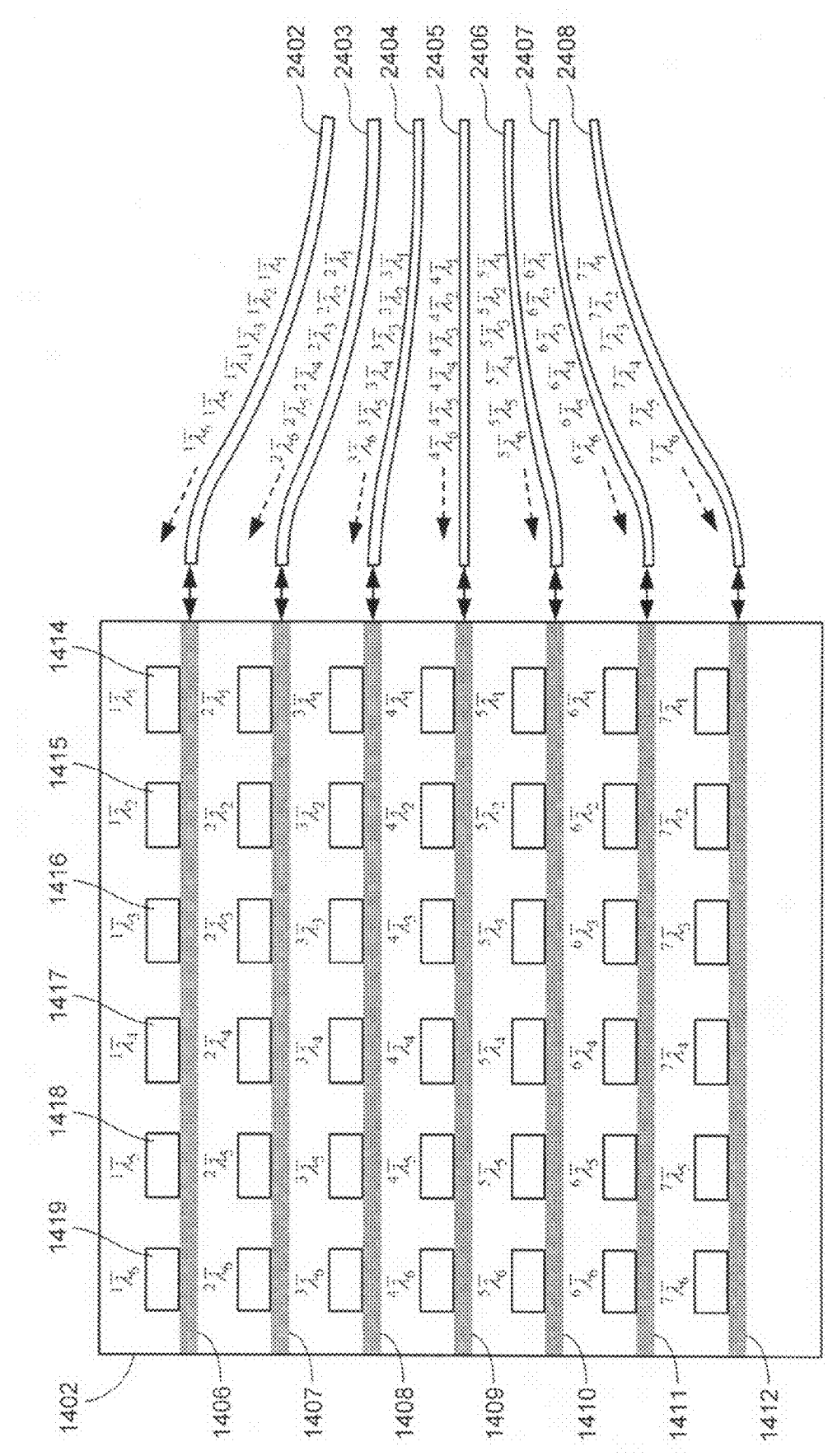

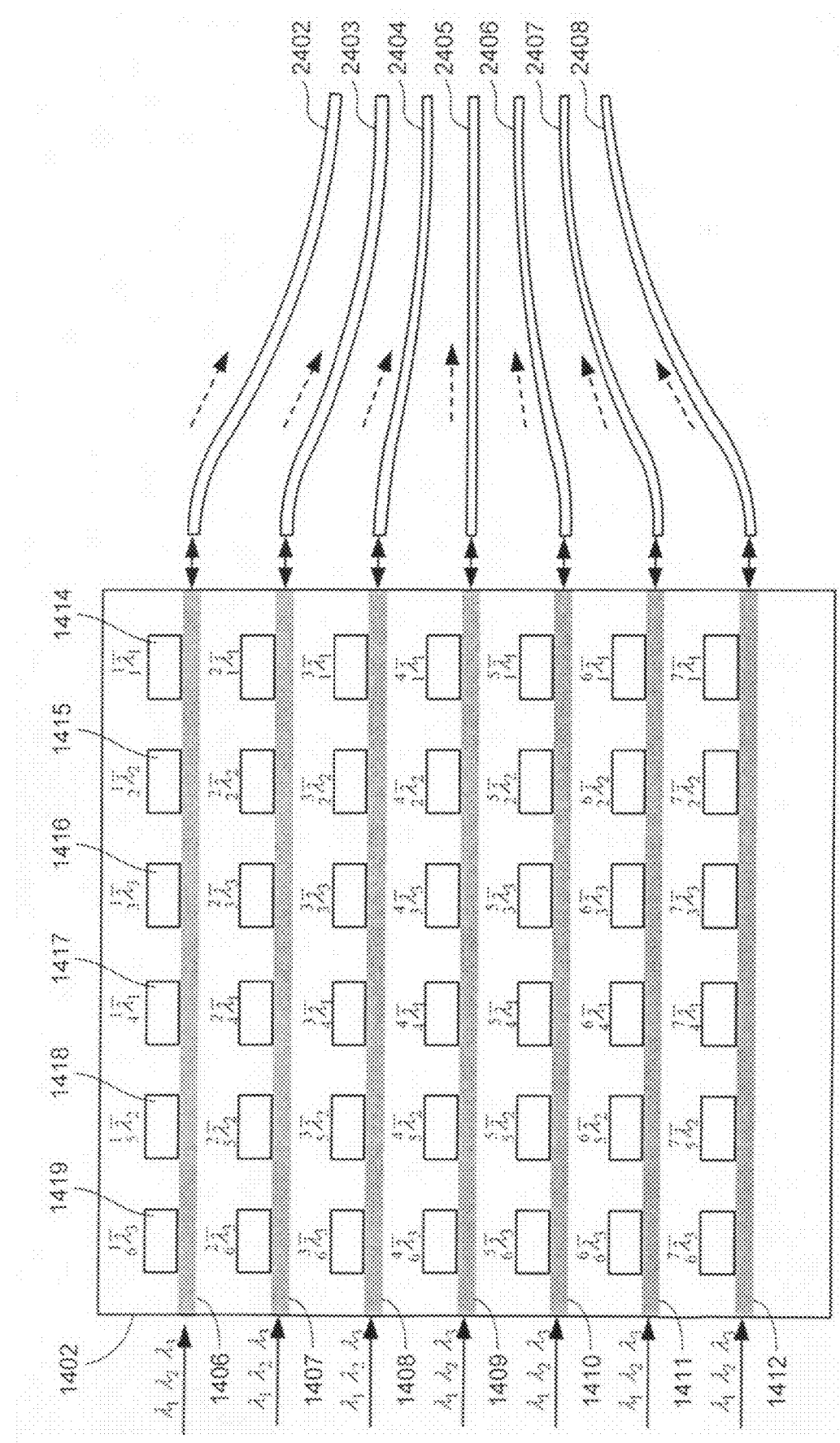

PHOTONIC-INTERCONNECT SYSTEMS FOR READING DATA FROM MEMORY CELLS AND WRITING DATA TO MEMORY INTEGRATED CIRCUITS

TECHNICAL FIELD

Embodiments of the present invention are related to photonic-interconnect system, and, in particular, to photonic-interconnect systems that are configured to read data from and write data to memory integrated circuits.

BACKGROUND

Since the mid-1970's, the use of optical fibers to transmit data has supplanted the use of conventional wires for a number of reasons. First, signal degradation or loss is much less for electromagnetic signals transmitted in optical fibers than for electrical signals transmitted over conventional wires. Second, optical fibers provide a much higher bandwidth than conventional wires. For example, a single Cu or Al wire can only transmit one electrical signal at a time, while a single optical fiber can transmit about 100 or more electromagnetic signals at a time. In other words, it takes 100 wires to transmit 100 data-encoded electrical signals, while a single optical fiber can transmit 100 data-encoded electromagnetic signals. Finally, because optical fibers can be drawn to smaller diameters than copper wire, more optical fibers can be bundled into a cross-sectional diameter than copper wires.

A source device transmits data to a destination device over optical fibers by first segmenting the data into packets which are then stored in a memory integrated circuit ("memory chip"). The memory chip comprises a large number of memory cells that can each be used to store a single bit of information. Each packet is then encoded in an electromagnetic signal and sent over an optical fiber network to the destination device. However, the parallel electromagnetic-signal-transmission benefits provided by optical fibers may be offset by the manner in which data is read from and written to the memory cells of the memory chips located at both the source and destination, because the bits comprising each data packet can only be read from and written to memory cells in relatively small numbers.

FIG. 1 illustrates a schematic representation of a typical optical-fiber data transmission between a source 102 and a destination 104. In FIG. 1, the source 102 includes a stack of data 106 to be transmitted to the destination 104. For example, the source 102 can be a video camera and the destination 104 can be a PC or other video displaying device. The source 102 prepares the data 106 for transmission to the destination 104 by breaking the data into packets 107-112 and storing the packets 107-112 in a memory chip 114 that serves as buffer. The memory chip 114 may be random access memory ("RAM") that temporality stores the packets 107-112 before the packets are sent to the destination 104. Each packet receives a header represented by a shaded region, such as header 116. The header includes the address of the destination 104, such as a TCP/IP address. The source 102 encodes the packets into electromagnetic signals by reading the bits stored in the memory cells in relatively small, such as 8, 16, or 64 bits at a time, and transmits the electromagnetic signals over an optical fiber network 118 to the destination 104. The destination 104 also includes a memory chip 120 that serves as a buffer for temporary storage of the packets 107-112. However, the bits comprising the packets are also written to the memory chip in relatively small numbers.

Although the optical fibers used to transmit packets between source and destination devices typically have a high bandwidth, the memory chips located at the source and destination slow down the rate of transmission because the corresponding memory chips read and write bits to each memory cell in relatively small numbers. Physicists, engineers, and computer scientists have recognized a need for systems that can speed up process of reading data from and writing data to memory chips.

SUMMARY

Various embodiments of the present invention are related to photonic-interconnect systems for reading data from and writing data to memory cells of memory chips at approximately the same time. In one embodiment of the present invention, A photonic-interconnect system comprises a photonic interconnect coupled to a photonic device. The photonic interconnect is coupled to the memory chip and is configured to encode a first data set stored in the memory cells into a first set of electromagnetic signals at approximately the same time, decode a second data set encoded in a second set of electromagnetic signals at approximately the same time, and store the second data set in the memory cells. The photonic device is configured to transmit the first set of electromagnetic signals out from the photonic interconnect and transmit the second set of electromagnetic signals into the photonic interconnect.

BRIEF DESCRIPTION OF THE DRAWINGS

FIG. 8 illustrates a photonic band structure of transverse electric field and magnetic field modes propagating in the two-dimensional photonic crystal shown in FIG. 5.

FIG. 15A illustrates an isometric view of the photonic interconnect and the memory chip shown in FIG. 14 that represents an embodiment of the present invention.

FIG. 15B illustrates a cross-sectional view of the photonic interconnect and the memory chip shown in FIG. 15A that represents an embodiment of the present invention.

FIGS. 23A-23B illustrate example operation of the second photonic-interconnect that represents an embodiment of the present invention.

FIGS. 24A-24B illustrate a top-view of a second kind of photonic interconnect coupled to optical fibers that represents an embodiment of the present invention.

FIG. 26 illustrates writing data in unencoded electromagnetic signals that represents an embodiment of the present invention.

DETAILED DESCRIPTION OF THE INVENTION

Various embodiments of the present invention are related to photonic-interconnect systems for reading data from and writing data to memory cells of memory chips at approximately the same time. The term "photonic" refers to devices that can be used to transmit either classical electromagnetic signals or quantized electromagnetic signals with wavelengths that span the electromagnetic spectrum. In other words, the term "photonic" as used to describe embodiments of the present invention is not limited to devices for transmitting single quanta of electromagnetic signals, also called "photons." The memory chips can be RAM or any other kind of storage device that employs memory cells to store bits of information. In order to assist readers in understanding descriptions of various embodiments of the present invention, overview subsections of related topics are provided. An overview of photonic crystals and waveguides is provided in a first subsection. An overview of encoding data in electromagnetic signals is provided in a second subsection. Finally, various system embodiments of the present invention are described in a third subsection.

An Overview of Photonic Crystals, Waveguides, and Resonant Cavities

Embodiments of the present invention employ concepts in photonic crystals, ridge waveguides, and other photonic devices. The textbooks *Fundamentals of Optical Waveguides*, by Katsunari Okamoto, Elsevier Inc. 2005, *Optical Waveguide Theory*, by Snyder and Love, Chapman and Hall, London, 1983, and *Photonic Crystals*, by Jean_Michel Lourtioz, Springer-Verlag, Berlin, 2005 are outstanding references in this field. In this subsection, topics in photonic crystals that relate to embodiments of the present invention are described. Additional details regarding ridge waveguides and other photonic devices can be obtained from the above-referenced textbooks, or from many other textbooks, papers, and journal articles related to this field.

Figure 2:
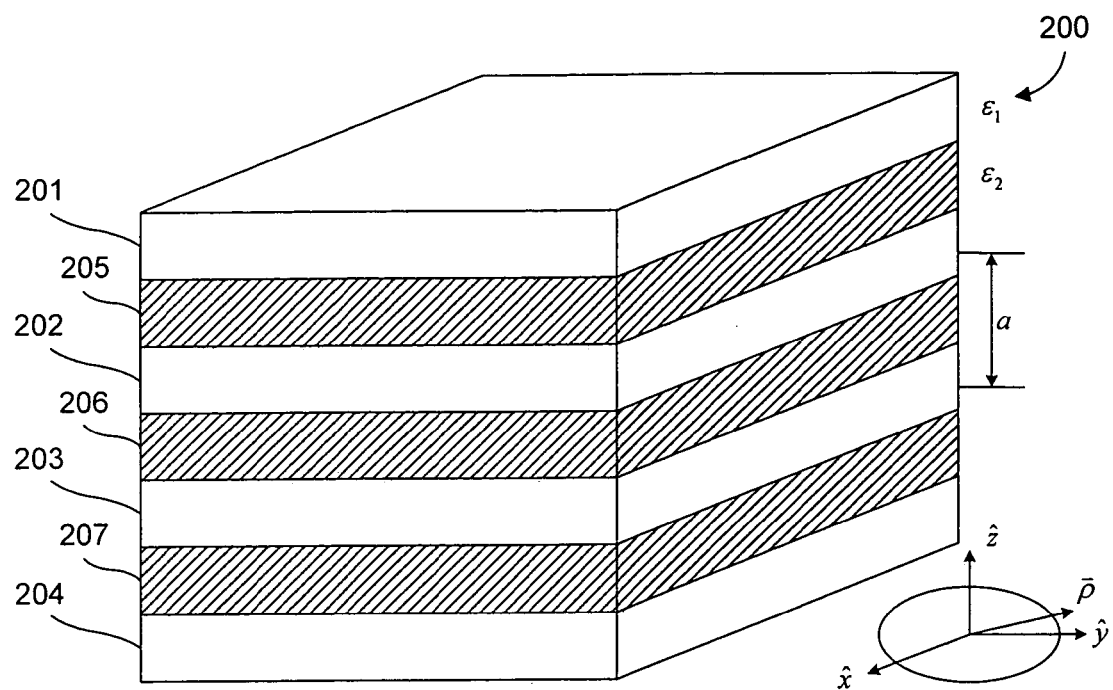
FIG. 2 illustrates an example of a one-dimensional photonic crystal.
Figure 3:
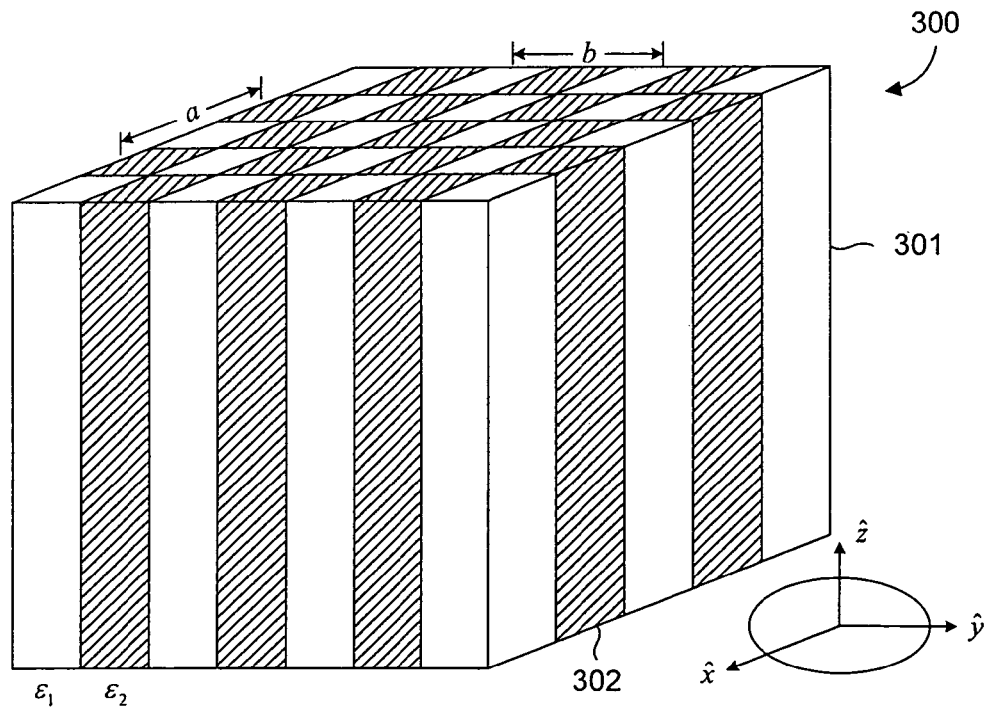
FIG. 3 illustrates an example of a two-dimensional photonic crystal.

Photonic crystals are photonic devices comprised of two or more different materials with dielectric properties that, when combined together in a regular pattern, can modify the propagation characteristics of electromagnetic radiation ("ER"). FIGS. 2 and 3 illustrate two of many different possible patterns in which two different materials with different dielectric properties can be combined to form a photonic crystal. Photonic crystals are typically identified by the number of directions in which the dielectric pattern is periodic. For example, FIG. 2 illustrates an example of a one-dimensional photonic crystal. In FIG. 2, a photonic crystal 200 is comprised of seven layers of two different dielectrics that alternate periodically in the z-direction. Unshaded layers 201-204 are comprised of a first dielectric having a dielectric constant $\epsilon_1$, and hash-marked layers 205-207 are comprised of a second dielectric having a different dielectric constant $\epsilon_2$. The layers are regularly spaced with a repeat distance called a "lattice constant," in the case of the lattice constant shown in FIG. 2, lattice constant a. FIG. 3 illustrates an example of a two-dimensional photonic crystal. The two-dimensional photonic crystal 300 comprises alternating layers of two different dielectrics, and is periodic in both the x-direction and the y-direction with two lattice constants a and b. Unshaded regions, such as region 301, are comprised of a first dielectric having dielectric constant $\epsilon_1$, and hash-marked regions, such as region 302, are comprised of a second dielectric having a different dielectric constant $\epsilon_2$. Photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves comprising oscillating, orthogonal electric fields, $\vec{E}$, and magnetic fields, $\vec{H}$, and a direction of propagation, $\vec{k}$. The electric and magnetic fields are related by Maxwell's equations:

$$\nabla \cdot \vec{H}(\vec{r}, t) = 0 \qquad \text{Equation 1}$$

$$\nabla \cdot \varepsilon(\vec{r})\vec{E}(\vec{r}, t) = 0 \qquad \text{Equation 2}$$

$$\nabla \times \vec{E}(\vec{r}, t) = -\frac{\partial \vec{H}(\vec{r}, t)}{\partial t} \qquad \text{Equation 3}$$

$$\nabla \times \vec{H}(\vec{r}, t) = \varepsilon(\vec{r})\frac{\partial \vec{E}(\vec{r}, t)}{\partial t} \qquad \text{Equation 4}$$

where $\vec{r}$ is spatial displacement of an electromagnetic wave in the dielectric, t is time, and $\epsilon(\vec{r})$ is a dielectric constant.

Because dielectrics do not generally support free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r},t)=\vec{H}(\vec{r})\exp(i\omega t)$$

$$\vec{E}(\vec{r},t)=\vec{E}(\vec{r})\exp(i\omega t)$$

where ω is the angular frequency of an electromagnetic wave propagating in a dielectric.

Maxwell's curl Equations 3 and 4 can be decoupled by dividing Equation 4 by the dielectric constant $\epsilon(\vec{r})$, applying the curl operator, and substituting Equation 3 for the curl of the electric field to give:

$$\Theta\vec{H}(\vec{r})=\omega^2\vec{H}(\vec{r}) \quad \text{Equation 5:}$$

where $$\Theta = \nabla \times \left(\frac{1}{\varepsilon(r)}\nabla \times\right)$$

is a differential operator.

Equation 5 is an eigenvalue equation, where the eigenvalues are $\omega^2$, and the eigenfunctions are the corresponding magnetic fields $\vec{H}(\vec{r})$. After the magnetic fields $\vec{H}(\vec{r})$ are determined according to Equation 5, the electric field $\vec{E}(\vec{r})$ can be obtained by substituting $\vec{H}(\vec{r},t)$ into Equation 3 and solving for $\vec{E}(\vec{r})$.

Figure 1:
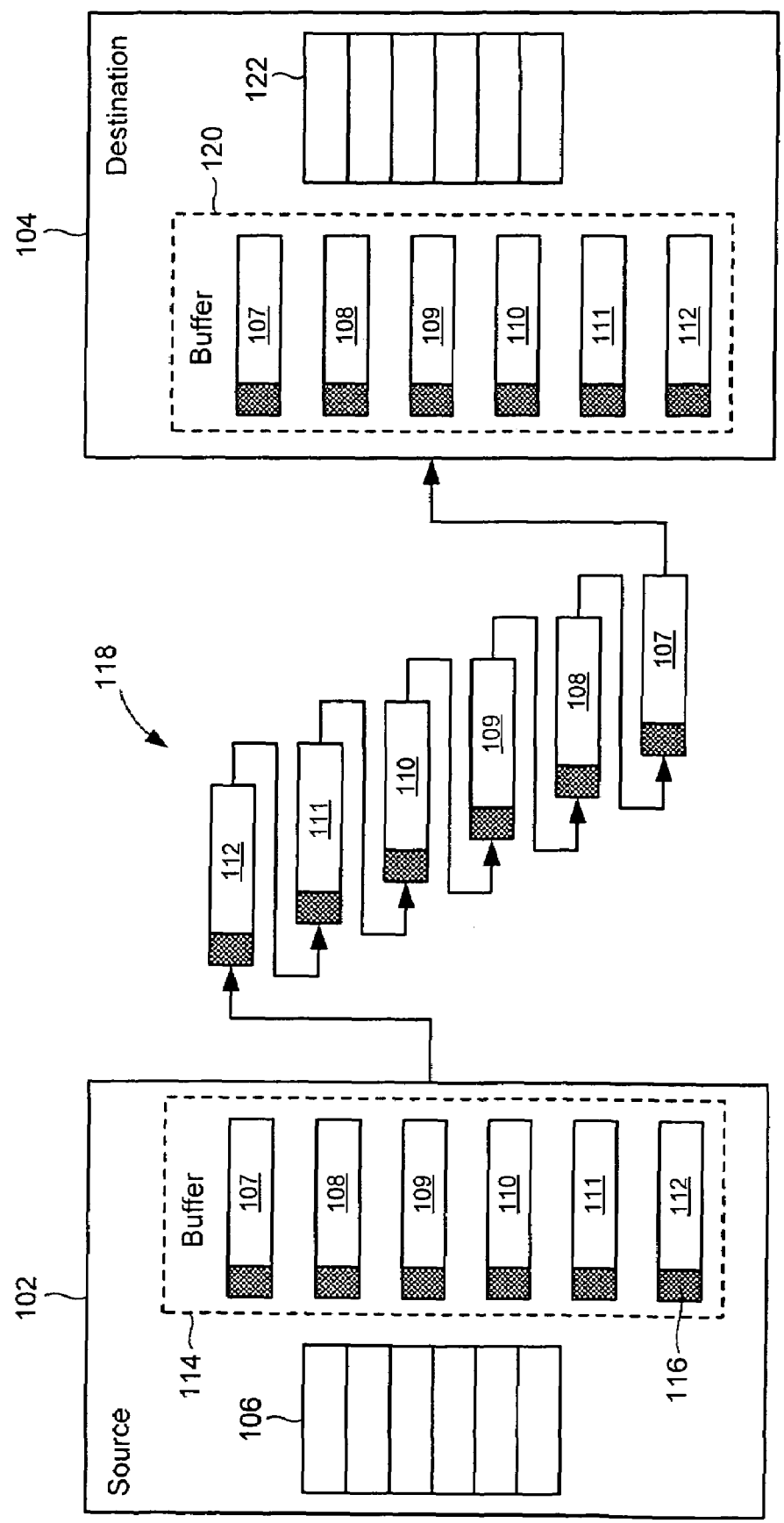
FIG. 1 illustrates a schematic representation of a typical optical-fiber data transmission between a source device and a destination device.

For finite dimensional photonic crystals, such as the photonic crystals shown in FIGS. 1 and 2, the eigenvalues and eigenfunctions of Equations 5 are quantized to give:

$$\Theta\vec{H}_j(\vec{r})=\omega_j^2\vec{H}_j(\vec{r})$$

where j is a non-negative integer value called the "band index" that labels the harmonic modes of the magnetic field $\vec{H}(\vec{r})$ in order of increasing angular frequency.

The translational symmetry of the photonic crystal can be used to determine the functional form of the magnetic fields $\vec{H}_j(\vec{r})$. For example, the functional form of the magnetic fields $\vec{H}_j(\vec{r})$ propagating in the photonic crystal 200 are given by the following:

$$\vec{H}_{j,k_\parallel,k_z}(\vec{r})=\exp(i\vec{k}_\parallel\cdot\vec{\rho})\exp(ik_z z)\vec{u}_{j,k_\parallel,k_z}(z) \quad \text{Equation 6:}$$

where $\vec{\rho}$ is an xy-plane vector, $\vec{k}_\parallel$ is an xy-plane wave vector, $k_z$ is a z-direction wave vector component, and $\vec{u}_{n,k_\parallel,k_z}(z)$ is a periodic function in the z-direction. The exponential term $\exp(i\vec{k}_\parallel\cdot\vec{\rho})$ in Equation 6 arises from the continuous translational symmetry of ER propagating through the dielectric layers in the xy-plane. However, the term $\exp(ik_z z)\vec{u}_{j,k_\parallel,k_z}(z)$ in Equation 6 arises from Bloch's theorem and the discrete translational symmetry imposed in the z-direction by the periodicity of the dielectric constant of the photonic crystal 200, given by:

$$\epsilon(\vec{r})=\epsilon(\vec{r}+\vec{R})$$

where $\vec{R}=al\hat{z}$, a is a lattice constant determined by the regular pattern of the dielectric layers, and l is an integer.

The magnetic fields $\vec{H}_{j,k_\parallel,k_z}(\vec{r})$ are periodic for integral multiples of 2π/a. As a result, the associated angular frequencies are also periodic:

Equation 7:

$$\omega_j(k_z) = \omega_j\left(k_z + \frac{m2\pi}{a}\right)$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where ν is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy, W, can be determined from the variational principle as follows:

$$W(\vec{H}) = \frac{1}{2(\vec{H},\vec{H})}\int d\vec{r}\frac{1}{\varepsilon(\vec{r})}|\nabla \times \vec{H}(\vec{r})|^2$$

where $(\vec{H},\vec{H})=\int d\vec{r}\,\vec{H}(\vec{r})^*\vec{H}(\vec{r})$, and "*" represents the complex conjugate. The electromagnetic energy is lower for harmonic modes propagating in regions with a high dielectric constant than for modes propagating in regions of a photonic crystal with a low dielectric constant.

The size of and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 4A:
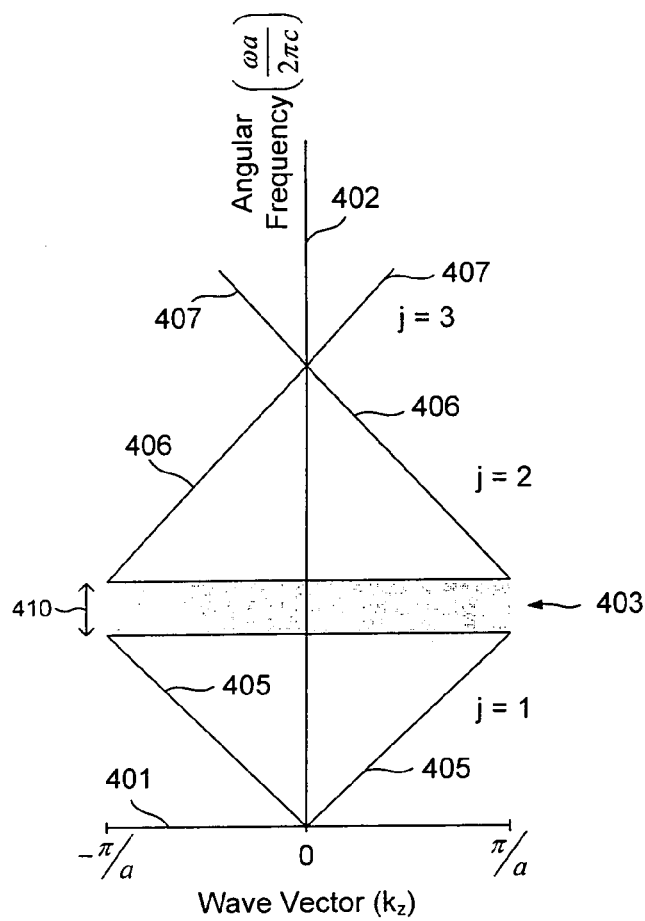
FIGS. 4A-4B are hypothetical plots of frequency versus wave vector z-component for a first one-dimensional photonic crystal and a second one-dimensional photonic crystal, respectively.
Figure 4B:
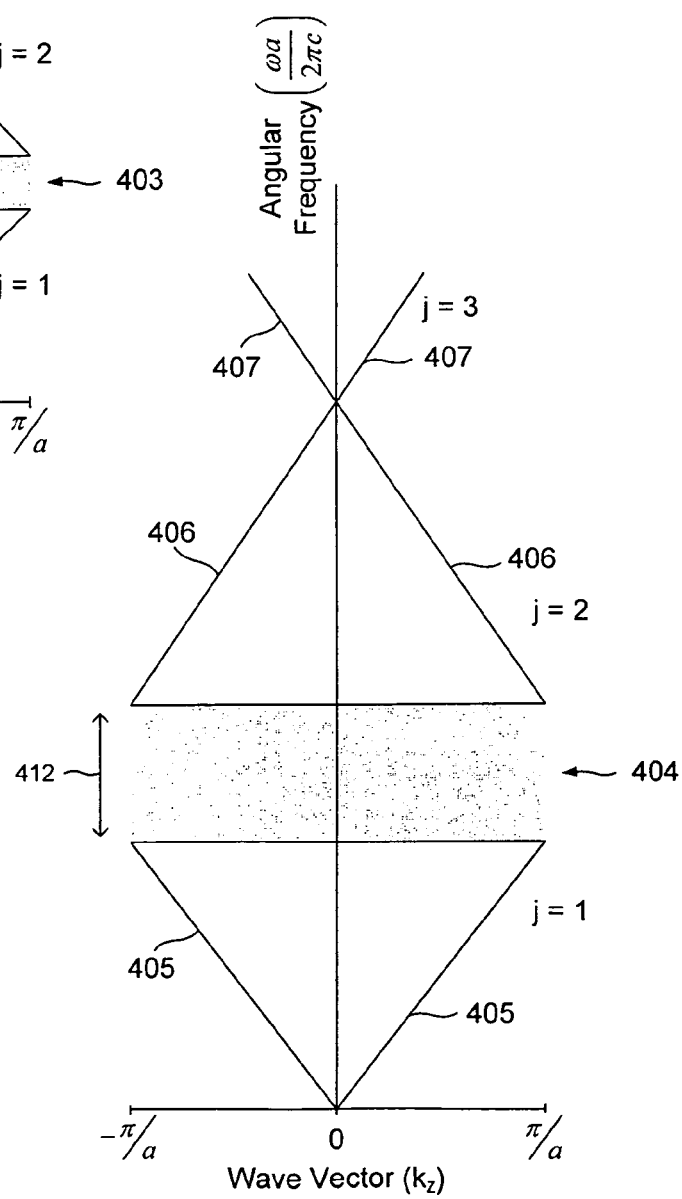

FIGS. 4A-4B are hypothetical plots of frequency ωa/2πc versus wave vector z-component, $k_z$, for a first one-dimensional photonic crystal and a second one-dimensional photonic crystal, respectively. In FIGS. 4A-4B, horizontal axes, such as horizontal axis 401, correspond to wave vector z-component $k_z$, and vertical axes, such as vertical axis 402, correspond to the frequency. Because the frequencies $\omega_j$ are periodic, as described above with reference to Equation 7, frequencies $\omega_j a/2\pi c$ are plotted with respect to wave vector z-component range $-\pi/a$ and $\pi/a$ for angular frequency bands j equal to 1, 2, and 3. The photonic bandgaps are identified by shaded regions 403 and 404. Lines 405, 406, and 407 correspond to the first, second, and third angular frequency bands (j=1, 2, and 3). The width 410 of the photonic bandgap 403, in FIG. 4A, is smaller than the width 412 of the photonic bandgap 404, in FIG. 4B, because the relative difference between the dielectric constants of the materials comprising the first photonic crystal is smaller than the relative difference between the dielectric constants of materials comprising the second photonic crystal. Also, the photonic bandgap 403 covers a lower range of frequencies than the range of frequencies covered by photonic bandgap 404.

Figure 5:
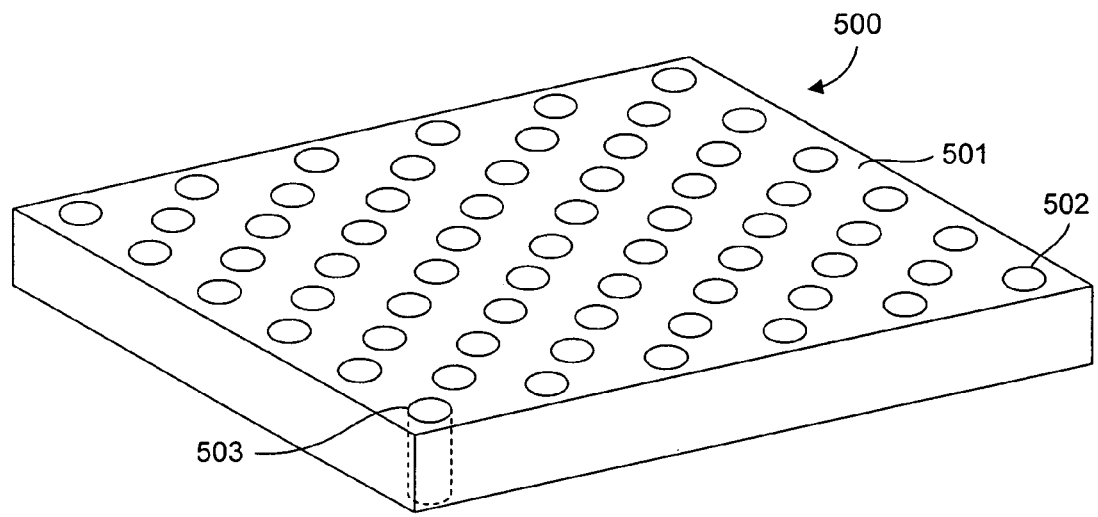
FIGS. 5-6 illustrate perspective views of two two-dimensional photonic crystals.
Figure 6:
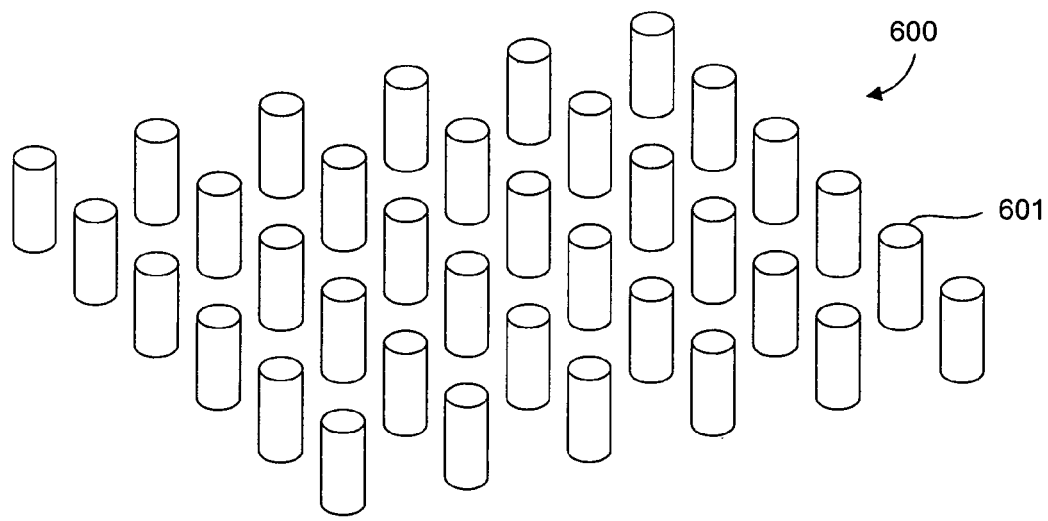

Two-dimensional photonic crystals can be comprised of a regular lattice of cylindrical holes fabricated in a dielectric slab. The cylindrical holes can be air holes or holes filled with a dielectric material different from the dielectric material of the photonic slab. FIG. 5 illustrates a perspective view of a two-dimensional photonic crystal. In FIG. 5, a photonic crystal 500 is comprised of a dielectric slab 501 with a regular lattice of embedded cylindrical holes, such as column 502. The cylindrical holes extend from the top surface to the bottom surface of the slab 501, as indicated by a cylindrical hole 503, and can be holes filled with air or any other material having a dielectric constant different from the dielectric constant of the slab 501. Two-dimensional photonic crystals can also be comprised of a regular lattice arrangement of cylindrical columns surrounded by a gas or a liquid. FIG. 6 illustrates a two-dimensional photonic crystal 600 having a regular square lattice of solid cylindrical columns, such as a cylindrical column 601, surrounded by fluid, such as gas or liquid, with a dielectric constant different from the cylindrical columns.

Figure 7A:
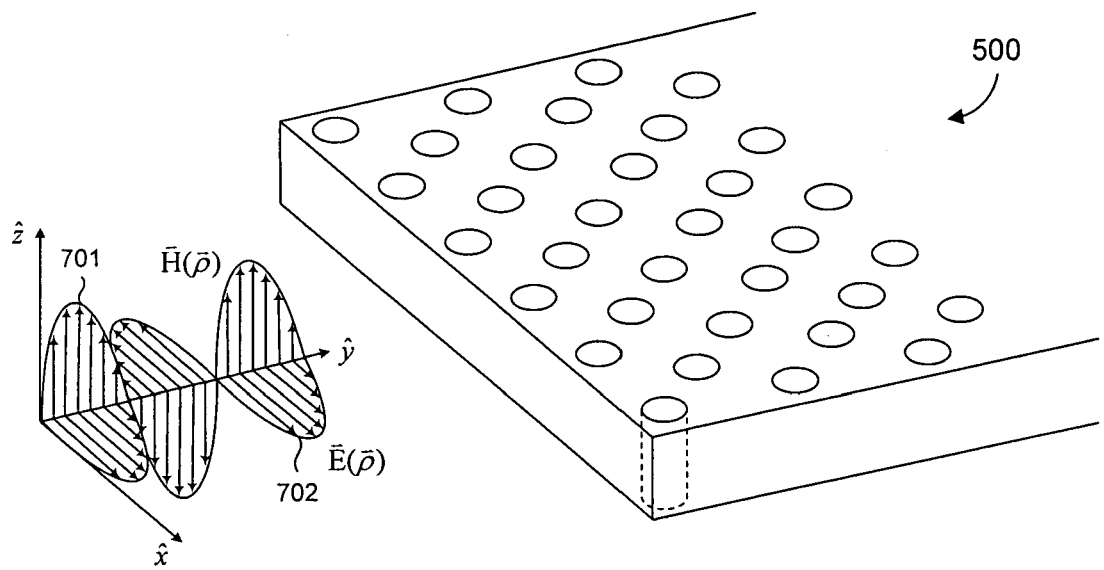
FIGS. 7A-7B illustrate propagation of a transverse electric field and magnetic field modes in the two-dimensional photonic crystal shown in FIG. 5.
Figure 7B:
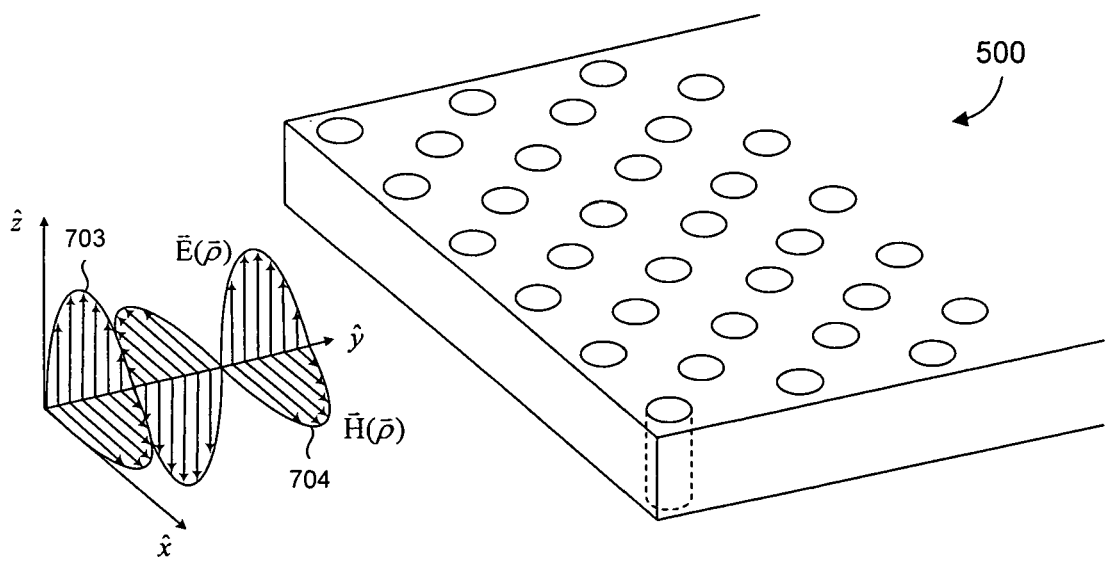

Two-dimensional photonic crystals polarize ER propagating in the periodic plane of the photonic crystal, and the electric and magnetic fields can be classified into two distinct polarizations: (1) the transverse electric-field ("TE") modes; and (2) the transverse magnetic-field ("TM") modes. The TE have $\vec{H}(\vec{\rho})$ directed normal to the periodic plane of the photonic crystal and $\vec{E}(\vec{\rho})$ directed in the periodic plane of the photonic crystal, while the TM have $\vec{E}(\vec{\rho})$ directed normal to the periodic plane of the photonic crystal and $\vec{H}(\vec{\rho})$ directed in the periodic plane of the photonic crystal. FIGS. 7A-7B illustrate propagation of TE and TM modes in the two-dimensional photonic crystal shown in FIG. 5. The periodic plane of the photonic crystal 500 lies in the xy-plane, the cylindrical holes are parallel to the z-direction, and ER propagates through the photonic crystal 500 in the y-direction. In FIG. 7A, an oscillating curve 701 represents the $\vec{H}(\vec{\rho})$ mode directed normal to the xy-plane, and an oscillating curve 702 represents the orthogonal $\vec{E}(\vec{\rho})$ mode directed in the xy-plane. In FIG. 7B, an oscillating curve 703 represents the $\vec{E}(\vec{\rho})$ mode directed normal to the xy-plane, and an oscillating curve 704 represents the orthogonal $\vec{H}(\vec{\rho})$ mode directed in the xy-plane.

FIG. 8 illustrates a photonic band structure of TM and TE modes of an ER propagating in the photonic crystal shown in FIG. 5. In FIG. 8, a vertical axis 801 represents the angular frequency of ER propagating in the photonic crystal 500, and a horizontal axis 802 represents the ER propagation paths between lattice points labeled Γ, M, and K in a photonic crystal segment 803 of the photonic crystal 500, shown in FIG. 5. Solid lines, such as solid line 804, represent TM modes, and dashed lines, such as dashed line 805, represent the TE modes. A shaded region 806 identifies a photonic bandgap in which neither the TE nor TM modes are permitted to propagate in the photonic crystal 500.

The width and the frequency range covered by photonic bandgaps in two-dimensional photonic crystal slabs, such as the photonic bandgap 806, depends on the periodic spacing of the cylindrical holes, represented by lattice constant a, and the relative difference between the dielectric constant of the slab and the dielectric constant of the cylindrical holes. Also, the frequency range covered by photonic bandgap 806 can be shifted to a higher frequency range for larger relative differences between the dielectric constant of the slab and the dielectric constant of the cylindrical holes, while the photonic bandgap 806 can be shifted to a lower frequency range for smaller relative differences between the dielectric constant of the slab and the dielectric constant of the cylindrical holes.

Two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical holes control which wavelengths of ER are prohibited from propagating in the two-dimensional photonic crystal. However, defects can be introduced into the lattice of cylindrical holes to produce particular localized components. In particular, a point defect, also referred to as a "resonant cavity," can be fabricated to provide a resonator that temporarily traps a narrow range of frequencies or wavelengths of ER. A line defect, also referred to as a "waveguide," can be fabricated to transmit ER with frequency ranges or wavelengths that lie within a frequency range of a photonic bandgap. As a result, a three-dimensional photonic crystal slab can be thought of as two-dimensional crystal having a refractive index n that depends on the thickness of the slab.

Figure 9:
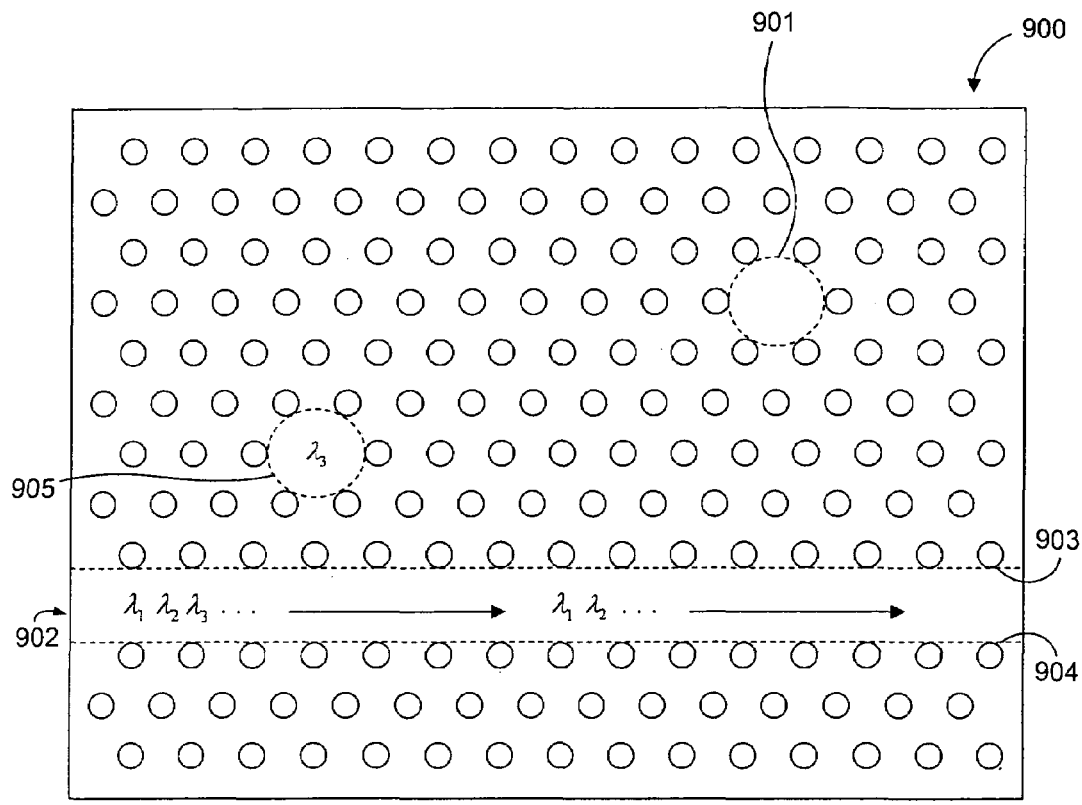
FIG. 9 illustrates an example of a photonic crystal with two resonant cavities and a waveguide.

FIG. 9 illustrates an example of a photonic crystal with two resonant cavities and a waveguide. A resonant cavity can be created in a two-dimensional photonic crystal slab by omitting, increasing, or decreasing the size of a select cylindrical hole. For example, a resonant cavity 901 is created in a photonic crystal 900 by omitting a cylindrical hole, as indicated by the empty region surrounded by a dashed-line circle. Resonant cavities 901 and 905 are surrounded by effectively reflecting walls that temporarily trap ER in the frequency range of the photonic bandgap. Resonant cavities can channel ER within a narrow frequency band in a direction perpendicular to the plane of the photonic crystal. For example, the resonant cavity 901 can trap localized TM modes and TE modes within a narrow frequency band of the photonic bandgap. Unless the photonic crystal 900 is sandwiched between two reflective plates or dielectrics that create total internal reflection, the ER resonating in the resonant cavity 901 can escape in the direction perpendicular to the periodic plane of the photonic crystal 900. Each resonant cavity has an associated quality ("Q") factor that provides a measure of how many oscillations take place in a cavity before the ER leaks into the region surrounding the resonant cavity.

Waveguides are optical transmission paths that can be used to direct ER within a particular frequency range of the photonic bandgap from a first location in a photonic crystal to a second location in the photonic crystal. Waveguides can be fabricated by changing the diameter of certain cylindrical holes within a column or row of cylindrical holes, or by omitting rows of cylindrical holes. For example, in the photonic crystal 900, a dielectric waveguide 902 is created by omitting an entire row of cylindrical holes during fabrication of the photonic crystal 900, as indicated by the empty region between dashed lines 903 and 904. The dielectric waveguide 902 transmits ER with wavelengths $\lambda_0$ and $\lambda_1$ along a single path. Networks of branching waveguides can be used to direct ER in numerous different pathways through the photonic crystal. The diameter of an electromagnetic signal propagating along a waveguide can be as small as $\lambda/3n$, where n is the refractive index of the waveguide, while a harmonic mode volume of a resonant cavity can be as small as $2\lambda/3n$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process called "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before leaking into the surroundings or backscattering into the waveguide. For example, in FIG. 9, the resonant cavity 901 is located too far from the waveguide 902 to extract a mode with particular wavelength of ER. However, the resonant cavity 905 is able to extract a fraction of ER with wavelength $\lambda_3$ propagating along the waveguide 902. Thus, a smaller fraction of ER with wavelength 23 may be left to propagate in the waveguide 902 along with ER of wavelengths $\lambda_1$ and $\lambda_2$.

Figure 10:
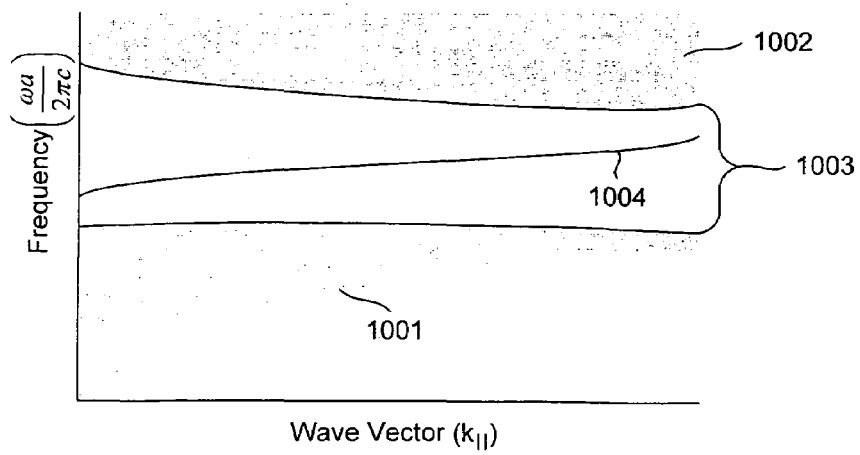
FIG. 10 is a hypothetical plot of frequency versus the magnitude of wave vector for the waveguide of the photonic crystal shown in FIG. 9.

FIG. 10 is a hypothetical plot of frequency versus the magnitude of wave vector $\vec{k}_\square$ for the waveguide of the photonic crystal shown in FIG. 9. In FIG. 10, shaded regions 1001 and 1002 represent projected first and second band structures of the photonic crystal 900 in the absence of the waveguide 902, shown in FIG. 9. A region 1003 identifies the photonic bandgap created by the photonic crystal 900. Line 1004 identifies a band of frequencies permitted to propagate in the waveguide 902. The number of frequency bands permitted to propagate in waveguide 902 can be increased by increasing the size of the waveguide 902. For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

An Overview of Encoding Data in Electromagnetic Radiation

Figure 11A:
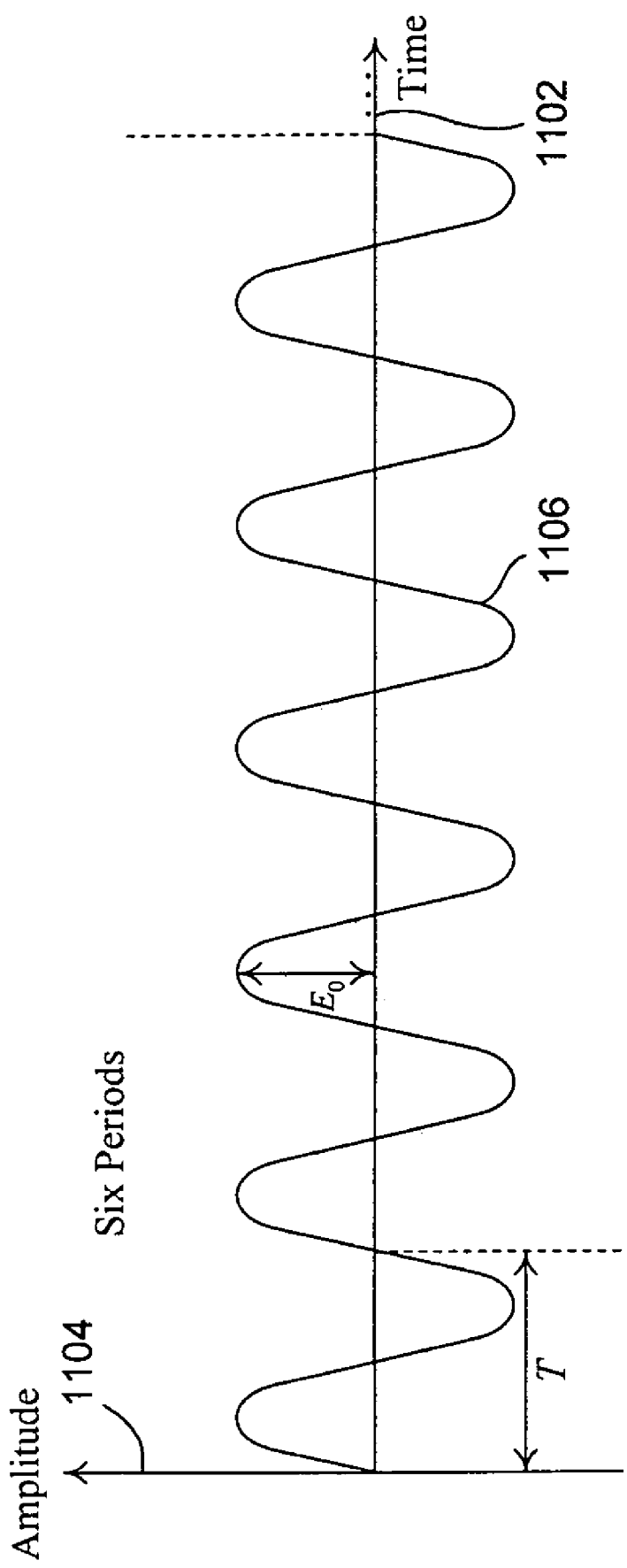
FIGS. 11A-11E illustrate examples of information encoded in electromagnetic signals.

A bit is a basic unit of information in computational systems and is equivalent to a choice between two alternatives, such as "yes" and "no," or "on" and "off." The two states for a bit are typically represented by the numbers 1 or 0. Information can be encoded in an electromagnetic wave by modulating the electromagnetic wave amplitude frequency, or phase. The modulated electromagnetic waves can then be transmitted over large distance in optical fibers, waveguides, or through free space, and decoded by a demodulator. However, most electromagnetic wave interactions with matter result from the electric field component rather than the magnetic field component, because the interaction of the magnetic field with ordinary matter is smaller than that of the electric field by the factor 1/c, where c represents the speed of light. As a result, and for the sake of simplicity, an electromagnetic wave can be represented by the electric field component:

$$E(z,t)=E_0\cos(zk-\omega t)$$

where the electric field propagates in the z direction, $\omega$ is angular frequency, k is a wavevector $\omega/c$, t is time, and $E_0$ is the amplitude. FIG. 11A is a plot of an electromagnetic wave as a function of time and a fixed observation point. In FIG. 11A, horizontal line 1102 is a time axis, vertical line 1104 is the amplitude $E_0$, and curve 1106 represents the electric field E(z,t). The period T is the time it takes for the electromagnetic signal to complete a cycle. The angular frequency $\omega$ is the number of times the electromagnetic field completes a cycle per unit of time and is equal to is $2\pi v$, where $v$ is the frequency, which is equal to 1/T.

Figure 11B:
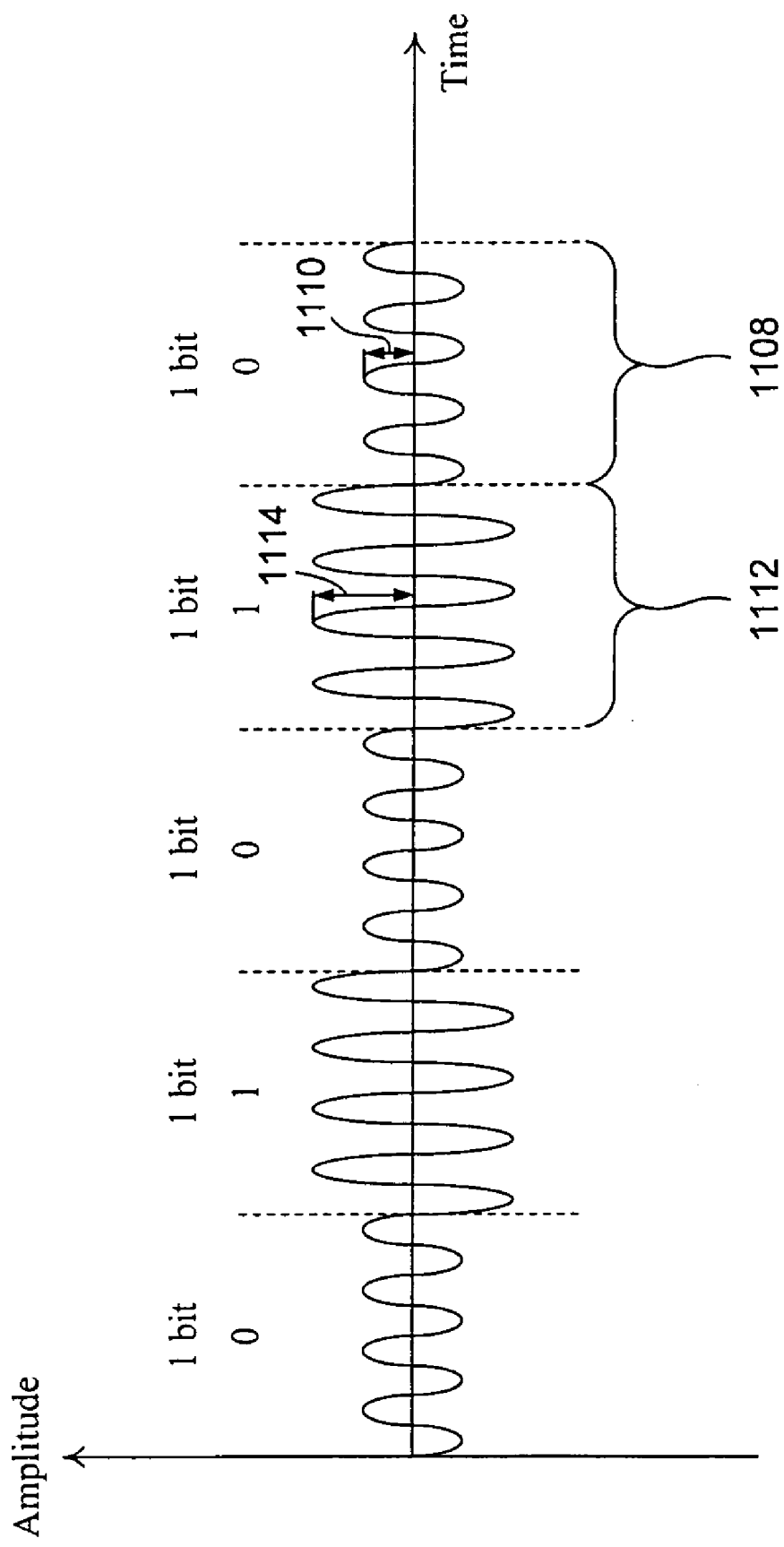
Figure 11C:
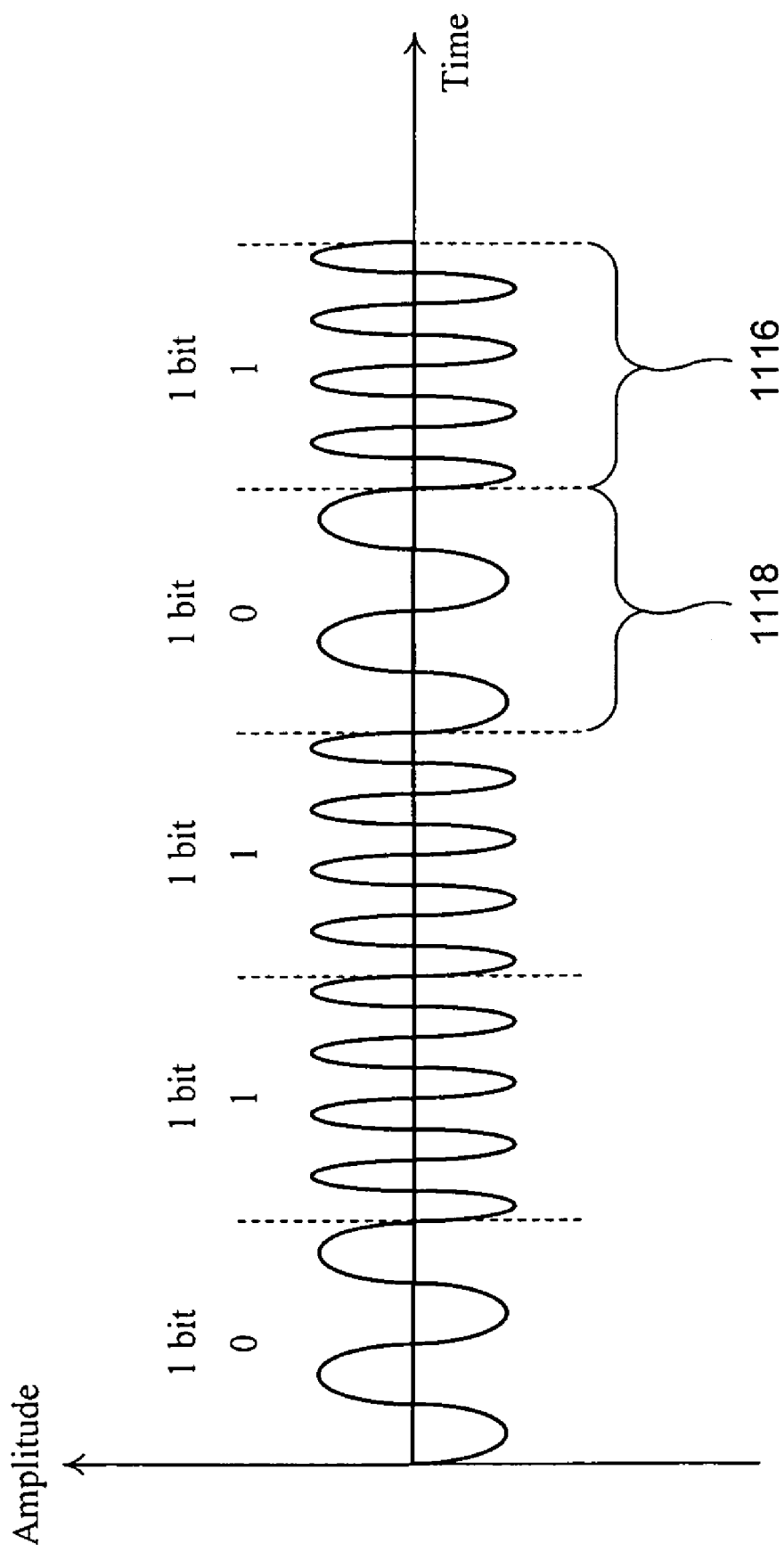
Figure 11D:
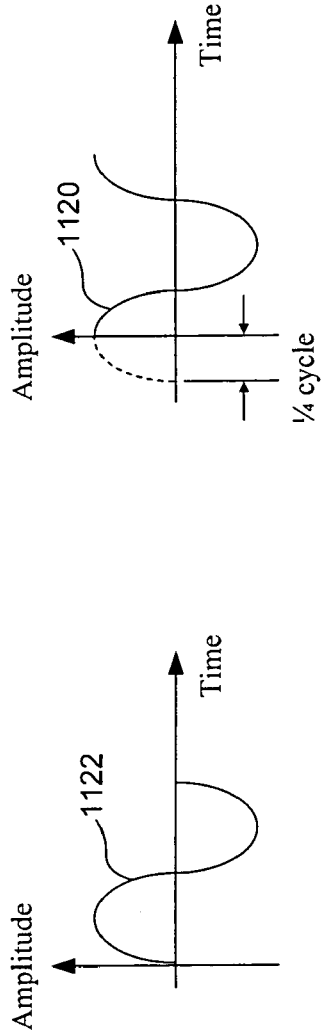
Figure 11E:
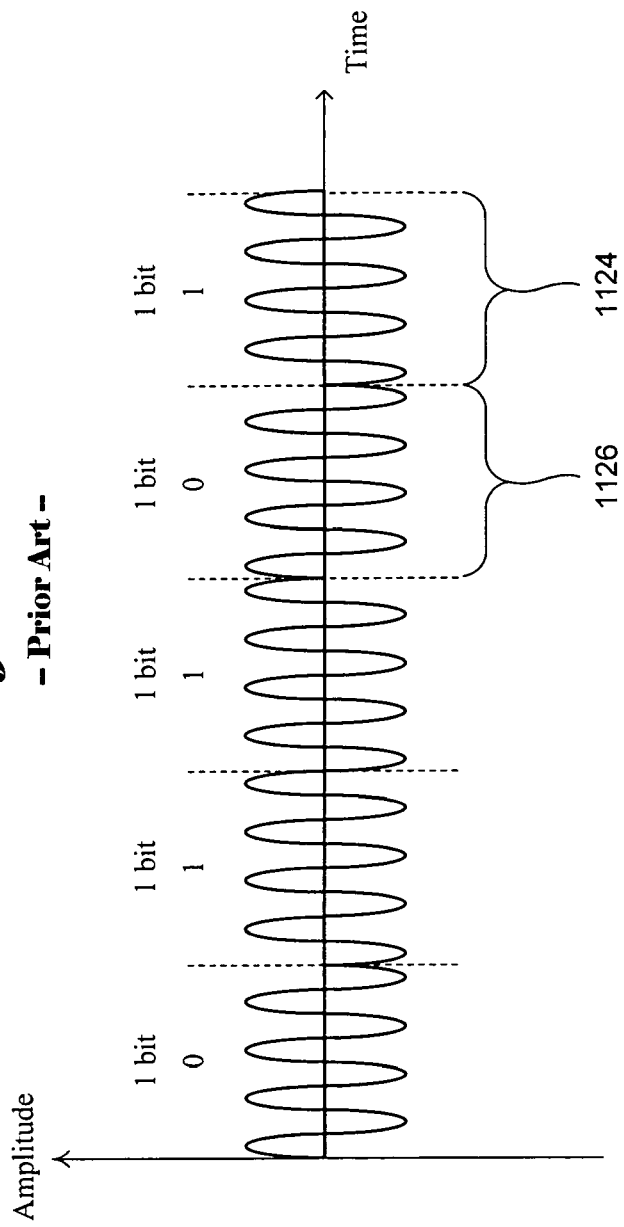

Amplitude modulation is used to encode information by changing the strength or magnitude of the amplitude of the electromagnetic signal. FIG. 11B illustrates an example of an amplitude modulated electromagnetic signal encoding of the bits "0" and "1." In FIG. 11B, a bit corresponds to four consecutive cycles of the signal, where the cycles 1108 with a small amplitude 1110 corresponds to the bit "0," and the cycles 1112 with a relatively large amplitude 1114 corresponds to the bit "1." Frequency modulation is used to encode information by varying the frequency of the electromagnetic signal. FIG. 11C illustrates an example of a frequency modulated electromagnetic signal encoding of the bits "0" and "1." In FIG. 11C, the four consecutive cycles 1116 correspond to the bit "1," and the two consecutive cycles 1118 corresponds to the bit "0." Phase modulation is used to encode information by shifting the phase of the electromagnetic signal as follows:

$$E(z,t)=E_0\cos(zk-\omega t+\phi)$$

where $\phi$ represents a phase shift. A phase shift corresponds to a shift in the waveform of the electromagnetic signal. For example, FIG. 11D illustrates a curve 1120 that includes a ¼ cycle phase shift of a curve 1122. FIG. 11E illustrates an example of a phase modulated electromagnetic signal encoding of the bits "0" and "1." In FIG. 11E, the cycles 1124 corresponds to a bit "1," and the cycles 1126 includes a ½ cycle phase shift that corresponds to the bit "0." The electromagnetic signals can also be modulated for telecommunications signals. For example, electromagnetic signals can be modulated for a return-to-zero ("RZ") or non-return-to-zero ("NRZ") line codes in telecommunication signals.

Embodiments of the Present Invention

Figure 12:
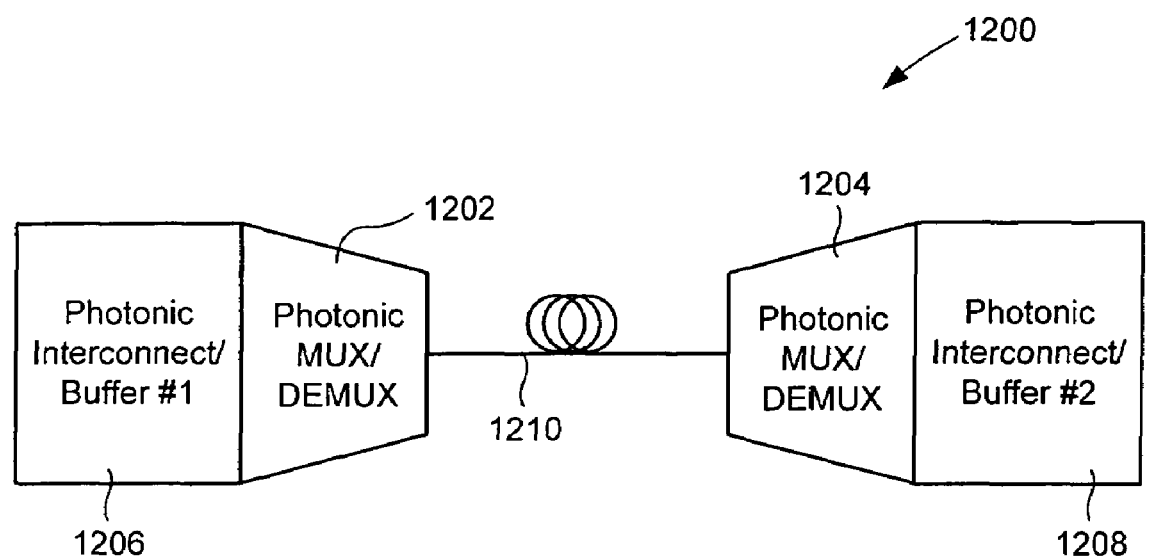
FIG. 12 illustrates a schematic representation of a first photonic-interconnect system that represents an embodiment of the present invention.

FIG. 12 illustrates a schematic representation of a first photonic-interconnect system 1200 that represents an embodiment of the present invention. The photonic-interconnect system 1200 comprises a first photonic multiplexer/demultiplexer ("MUX/DEMUX") 1202, a second photonic MUX/DEMUX 1204, a first photonic interconnect 1206, a second photonic interconnect 1208, and a waveguide 1210. The first and second photonic interconnects 1206 and 1208 may each be coupled to a different memory chip (not shown). The waveguide 1208 interconnects the first photonic MUX/

DEMUX 1202 to the second photonic MUX/DEMUX 1204 and may represent a waveguide or an optical fiber that can range in length from about 1 micron to tens of thousands of kilometers. The first photonic MUX/DEMUX 1202 is interconnected to the first photonic interconnect 1206, and the second photonic MUX/DEMUX 1204 is interconnected to the second photonic interconnect 1208. Note that the photonic-interconnect system 1200 is not limited to a single waveguide 1208. In other embodiments of the present invention, based on the bandwidth needed to transmit data between memory chips, any number of waveguides can be used to interconnect the first and second photonic MUX/DEMUXs 1202 and 1204.

Figure 13A:
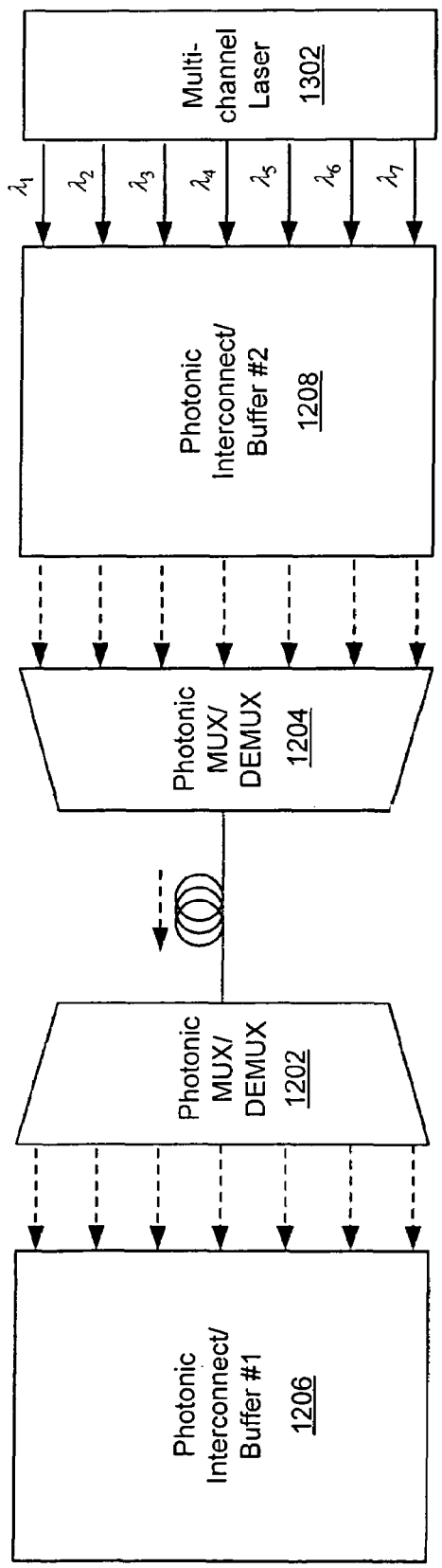
FIGS. 13A-13B illustrate example operations of the first photonic-interconnect system shown in FIG. 12 that represents an embodiment of the present invention.
Figure 13B:
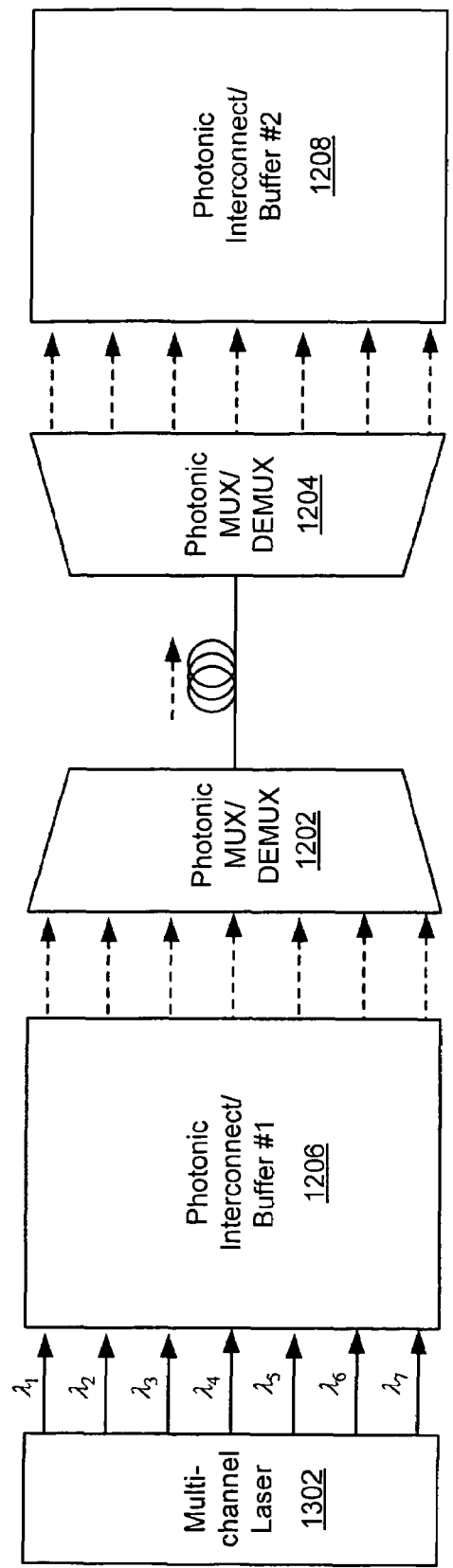

FIGS. 13A-13B illustrate example operations of the first photonic-interconnect system 1200 to read data from and write data to two memory chips that represents an embodiment of the present invention. As shown in FIG. 13A, a multi-channel laser 1302 transmits seven substantially parallel unencoded electromagnetic signals to the photonic interconnect 1208. Each of the unencoded electromagnetic signals has a different wavelength represented by $\lambda_1$, $\lambda_2$, $\lambda_3$, $\lambda_4$, $\lambda_5$, $\lambda_6$, and $\lambda_7$, where subscripts identify the different wavelengths. As the electromagnetic signals are transmitted through the second photonic interconnect 1208, data stored in the memory cells of the memory chip (not shown) are written to the unencoded electromagnetic signals to produce encoded electromagnetic signals at approximately the same time. For example, as the unencoded electromagnetic signals $\lambda_1$ and $\lambda_2$—propagate through the photonic interconnect 1208, the data stored in a first set of six different memory cells is encoded in the signal $\lambda_1$ by generating six different encoded electromagnetic signals $_1\overline{\lambda_1}$, $_2\overline{\lambda_1}$, $_3\overline{\lambda_1}$, $_4\overline{\lambda_1}$, $_5\overline{\lambda_1}$, and $_6\overline{\lambda_1}$, and the data stored in a second set of six different memory cells is encoded in the signal $\lambda_2$ by generating six different encoded electromagnetic signals $_1\overline{\lambda_2}$, $_2\overline{\lambda_2}$, $_3\overline{\lambda_2}$, $_4\overline{\lambda_2}$, $_5\overline{\lambda_1}$, and $_6\overline{\lambda_2}$, where the overbar identifies an encoded electromagnetic signal, and the subscripts in the lower left identify data released from different memory cells. Encoding is described in greater detail below with reference to FIGS. 16-20. The second photonic MUX/DEMUX 1204 places the encoded electromagnetic signals into the waveguide 1210 so that encoded electromagnetic signals can propagate to the first photonic MUX/DEMUX 1202, which separates and transmits the encoded electromagnetic signals to the first photonic interconnect 1206. As the encoded electromagnetic signals propagate through the photonic interconnect 1206 the data encoded in the electromagnetic signals are read at approximately the same and stored in coupled memory cells of a memory chip (not shown).

FIG. 13B illustrates an overview of writing data at the first photonic interconnect 1206 and reading data at the second photonic interconnect 1208, which is identical to the operation described with reference to FIG. 13A. Therefore, for the sake of brevity, a description of the operation illustrated in FIG. 13B is not included.

Figure 14:
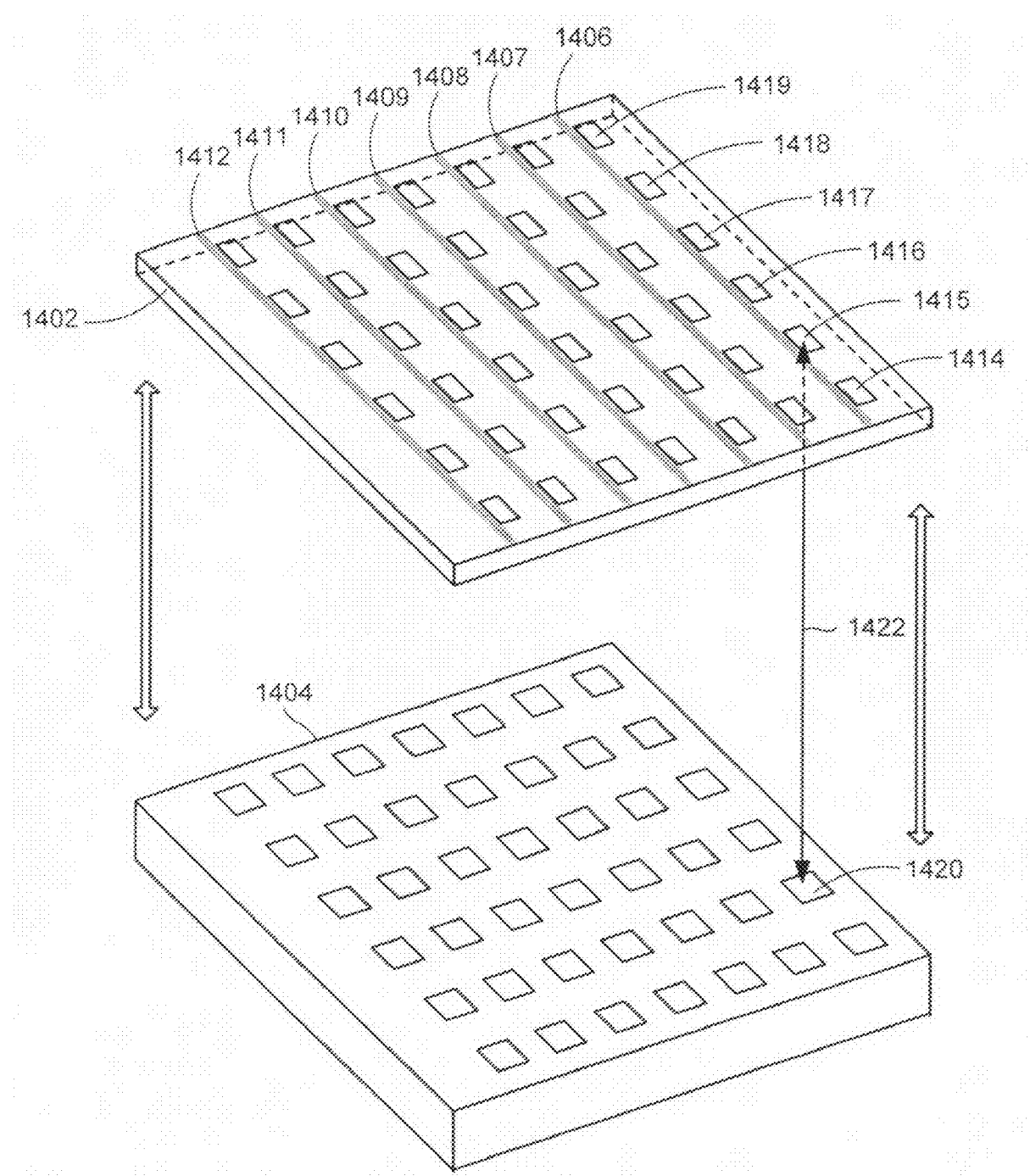
FIG. 14 illustrates an exploded isometric view of a photonic interconnect and a memory chip that represents an embodiment of the present invention.

FIG. 14 illustrates an exploded isometric view of a photonic interconnect 1402 and a memory chip 1404 that represents an embodiment of the present invention. The photonic interconnect 1402 is a photonic crystal comprising 7 roughly parallel waveguides 1406-1412. Each waveguide 1406-1412 is coupled to six different photonic nodes. For example, the waveguide 1406 is coupled to six different photonic crystal nodes 1414-1419. Photonic nodes architectures and operations are described in greater detail below with reference to FIGS. 18-20. The memory chip 1404 comprises 42 memory cells arranged in a regular lattice, where each memory cell is represented by box, such as box 1420. When the photonic interconnect 1402 is placed on top of the memory chip 1404, each memory cell couples to a corresponding photonic node in the photonic interconnect 1402. For example, when the photonic interconnect 1402 is placed on top of the memory chip 1404, the photonic node 1415 is coupled to the memory cell 1420, as indicated by double-headed directional arrow 1422.

FIG. 15A illustrates an isometric view of the photonic interconnect 1402 placed on top of the memory chip 1404 that represents an embodiment of the present invention. FIG. 15B illustrates a cross-sectional view of the photonic interconnect 1402 placed on top of the memory chip 1404 that represents an embodiment of the present invention. As shown in FIG. 15B, each photonic node is coupled to a waveguide and a memory cell. For example, the photonic node 1417 is coupled to the waveguide 1406 and the memory cell 1502.

Figure 16A:
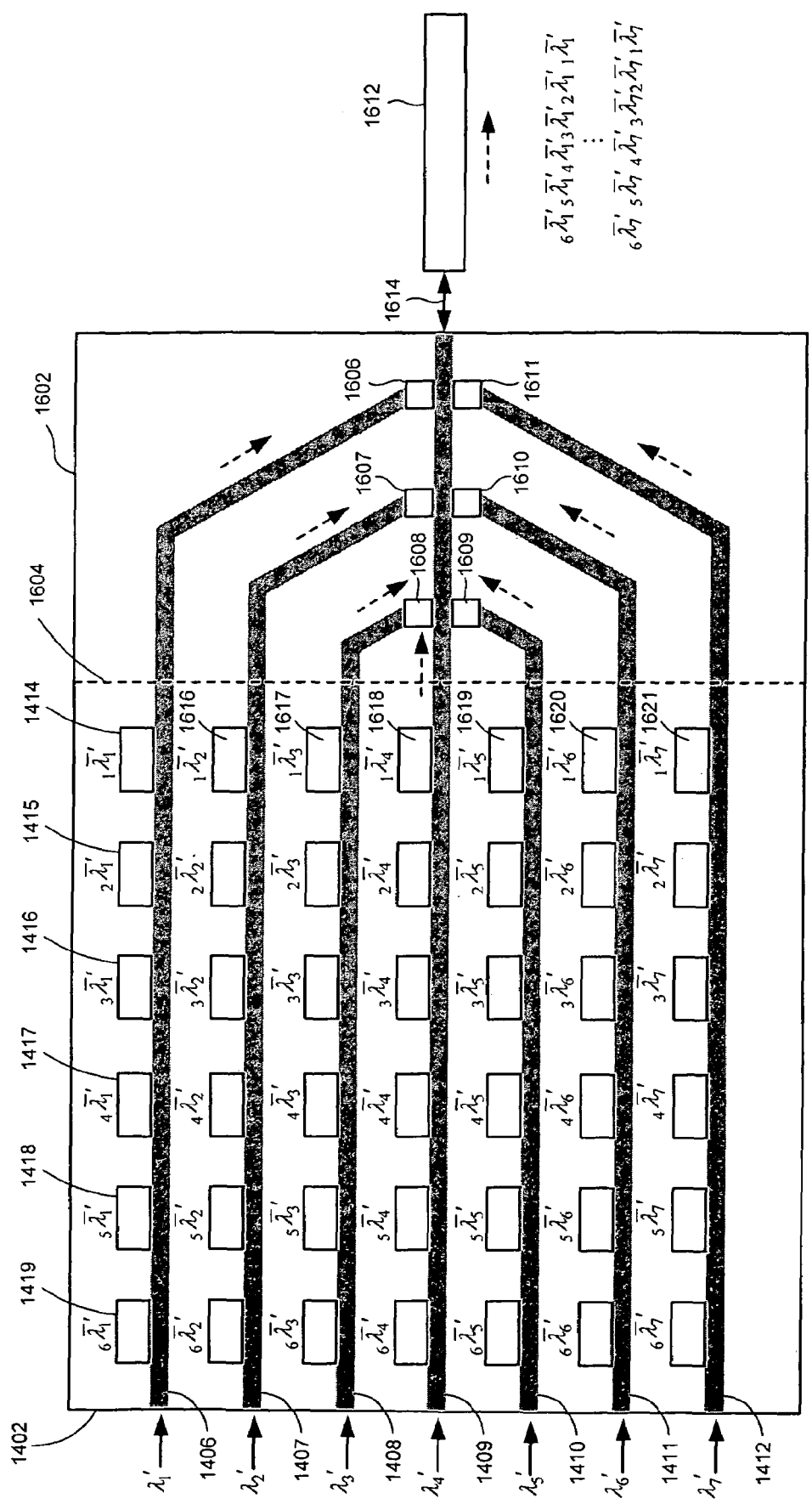
FIGS. 16A-16B illustrates a top-view of the photonic interconnect and a photonic multiplexer/demultiplexer that represents an embodiment of the present invention.
Figure 16B:
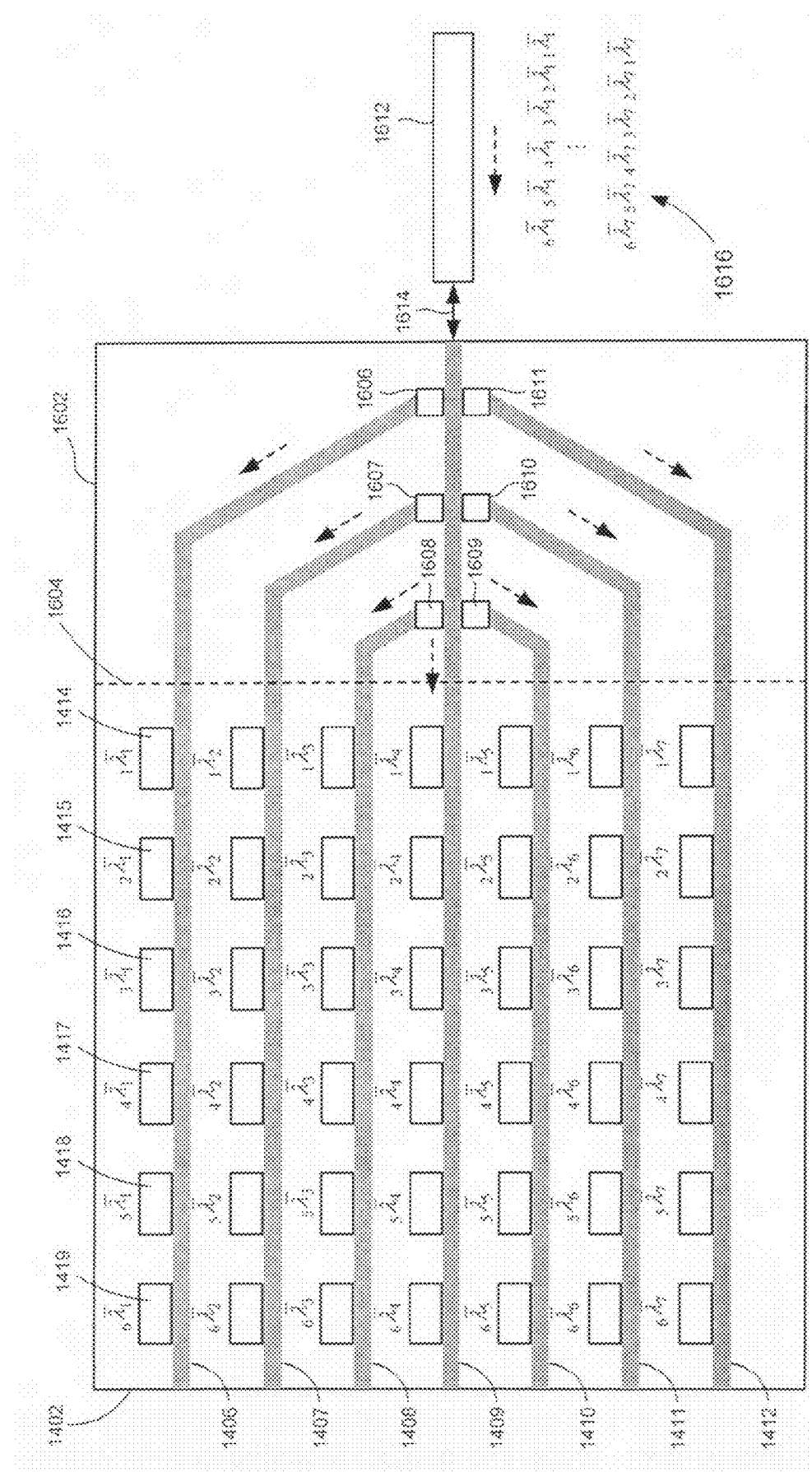

FIGS. 16A-16B illustrates a top-view of the photonic interconnect 1402 coupled to a photonic MUX/DEMUX 1602 that represents an embodiment of the present invention. Both the photonic MUX/DEMUX 1602 and the photonic interconnect 1402 can be formed in the same crystal slab or formed in different slabs that are coupled together along the dashed line 1604. As shown in both FIGS. 16A-16B, the waveguides extend from the photonic interconnect 1402 into the photonic MUX/DEMUX 1602. The waveguides 1406-1408 and 1410-1412 bend toward to the center waveguide 1409 and are coupled to the center waveguide 1409 by waveguide couplers 1606-1611, respectively. Waveguide couplers are described in detail below with reference to FIG. 17. The center waveguide 1409 is coupled to an optical fiber 1612 via a fiber-to-photonic waveguide coupler 1614, which is described below with reference to FIG. 25.

FIG. 16A illustrates encoding data in unencoded electromagnetic signals that represents an embodiment of the present invention. As shown in FIG. 16A, seven unencoded electromagnetic signals of different wavelengths $\lambda_1'$, $\lambda_2'$, $\lambda_3'$, $\lambda_4'$, $\lambda_5'$, $\lambda_6'$, and $\lambda_7'$, are input to the waveguides 1406-1412, respectively. As the unencoded electromagnetic signal propagate through the waveguides 1406-1412, the electromagnetic signals $\lambda_1'$, $\lambda_2'$, $\lambda_3'$, $\lambda_4'$, $\lambda_5'$, $\lambda_6'$, and $\lambda_7'$ are encoded substantially at the same time with data output from the memory cells coupled to the photonic nodes. For example, the electromagnetic signal $\lambda_1'$ is extracted by each of the photonic nodes 1414-1419 and substantially at the same time encoded with the data stored in each of the coupled memory cells to produce encoded electromagnetic signals $_1\overline{\lambda_1'}$, $_2\overline{\lambda_1'}$, $_3\overline{\lambda_1'}$, $_4\overline{\lambda_1'}$, $_5\overline{\lambda_1'}$, and $_6\overline{\lambda_1'}$. The encoded electromagnetic signals generated by each row of photonic nodes are transmitted through the waveguides 1406-1408 and 1410-1412, through the waveguide couplers 1606-1611, and through the center waveguide 1409 to the optical fiber 1612.

When overwriting data to encoded electromagnetic signals propagating in the same waveguide is a concern, alternate embodiments of the present invention may include systems for controlling the manner in which data is encoded in the unencoded electromagnetic signals. For example, the photonic nodes in each column of photonic nodes, such as column photonic nodes 1414 and 1616-1621, may be turned "ON" and "OFF" in each column at approximately the same time from right to left. Turning photonic nodes "ON" and "OFF" in order to extract electromagnetic signals is described below with reference to FIGS. 18-20. For example, as the unencoded electromagnetic signal $\lambda_1'$ propagates in the waveguide 1406, the photonic node 1414 is turned "ON" and a portion of the unencoded electromagnetic signal $\lambda_1'$ is extracted and encoded with data released by a memory chip coupled to the photonic node 1414. An encoded electromagnetic signal $_1\overline{\lambda_1}'$ is then placed back in the waveguide process is 1406, and the process is repeated for each of the photonic nodes 1414-1419 to produce the six encoded electromagnetic signals $_1\overline{\lambda_1}'$, $_2\overline{\lambda_1}'$, $_3\overline{\lambda_1}'$, $_4\overline{\lambda_1}'$, $_5\overline{\lambda_1}'$, and $_6\overline{\lambda_1}'$.

FIG. 16B illustrates decoding data encoded electromagnetic signals that represents an embodiment of the present invention. As shown in FIG. 16B, encoded electromagnetic signals 1616 are transmitted in the optical fiber 1612. The encoded electromagnetic signals 1616 are coupled into the center waveguide 1409 via fiber-to-waveguide coupler 1614. As the electromagnetic signals 1616 propagate in the center waveguide 1409, the waveguide couplers 1606-1611 extract the encoded electromagnetic signals according to wavelength. For example, the waveguide coupler 1606 extracts the encoded electromagnetic signals with the wavelength $\overline{\lambda_1}$. Operation of the waveguide couplers 1606-1611 is described below with reference to FIG. 17. The encoded electromagnetic signals propagate through the waveguide 1406-1412 to the photonic nodes where the electromagnetic signal are extracted the photonic nodes at approximately the same time, and the encoded information is stored in coupled memory cells. In alternate embodiments of the present invention, the columns of photonic nodes may be turned "ON" and "OFF" consecutively in order to extract the encoded electromagnetic signals. For example, the waveguide coupler 1606 extracts the electromagnetic signals $_1\overline{\lambda_1}$, $_2\overline{\lambda_1}$, $_3\overline{\lambda_1}$, $_4\overline{\lambda_1}$, $_5\overline{\lambda_1}$, and $_6\overline{\lambda_1}$ from the center waveguide 1409 and places these signals in the waveguide 1406. The photonic node 1414 is turned "ON" long enough to extract the electromagnetic signal $_1\overline{\lambda_1}$ and then turned "OFF." Next, the photonic node 1415 is turned "ON" long enough to extract the electromagnetic signal $_2\overline{\lambda_1}$ and then turned "OFF." The process is repeated for the remaining electromagnetic signals.

Figure 17A:
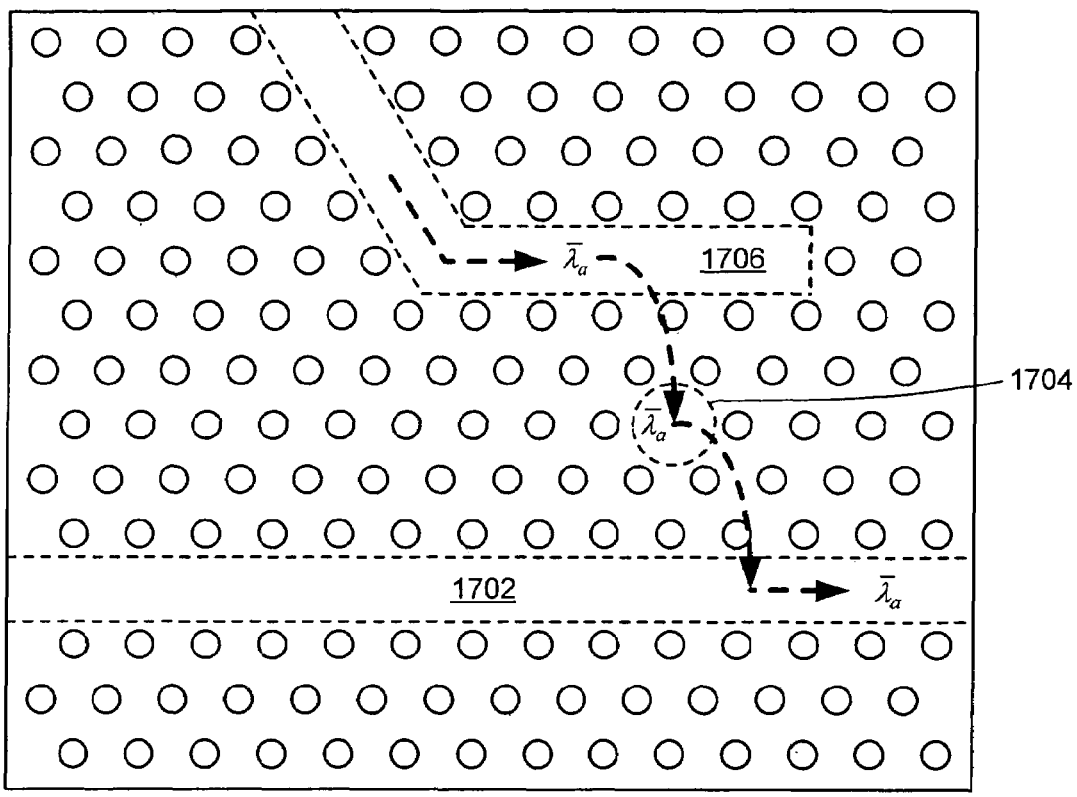
FIGS. 17A-17B illustrate a waveguide coupler that represent an embodiment of the present invention.
Figure 17B:
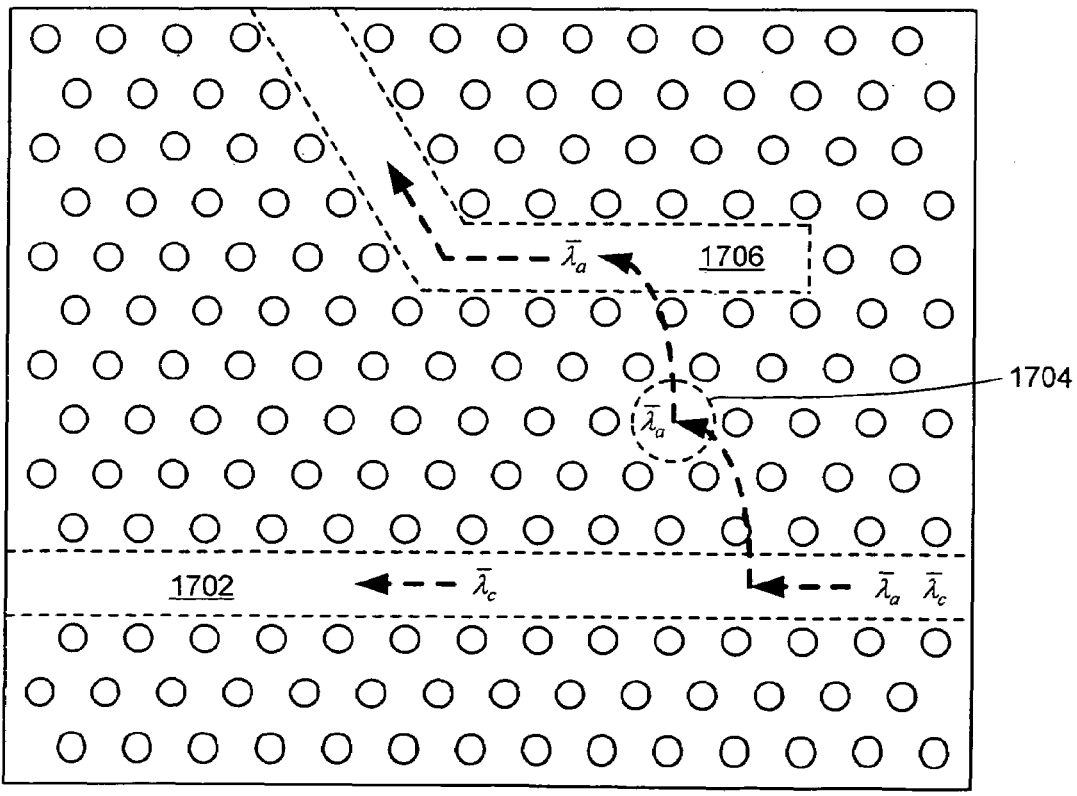

FIGS. 17A-17B illustrate a waveguide coupler located next to a bus waveguide 1702 that represent an embodiment of the present invention. The waveguide coupler comprises a single resonant cavity 1704 that couples the bus waveguide 1702 to a bent waveguide 1706. The waveguide coupler 1704 is fabricated to extract and hold electromagnetic signals with a wavelength $\lambda_a$. As shown in FIG. 17A, the waveguide coupler 1704 can be used to introduce an encoded electromagnetic signal $\overline{\lambda_a}$ to the bus waveguide 1702 via evanescent coupling. As shown in FIG. 17B, the waveguide coupler 1704 can be used to extract the encoded electromagnetic signal $\overline{\lambda_a}$ via evanescent coupling and leave other encoded electromagnetic signals, such as encoded signal $\overline{\lambda_c}$, propagating in the bus waveguide 1702.

Figure 18:
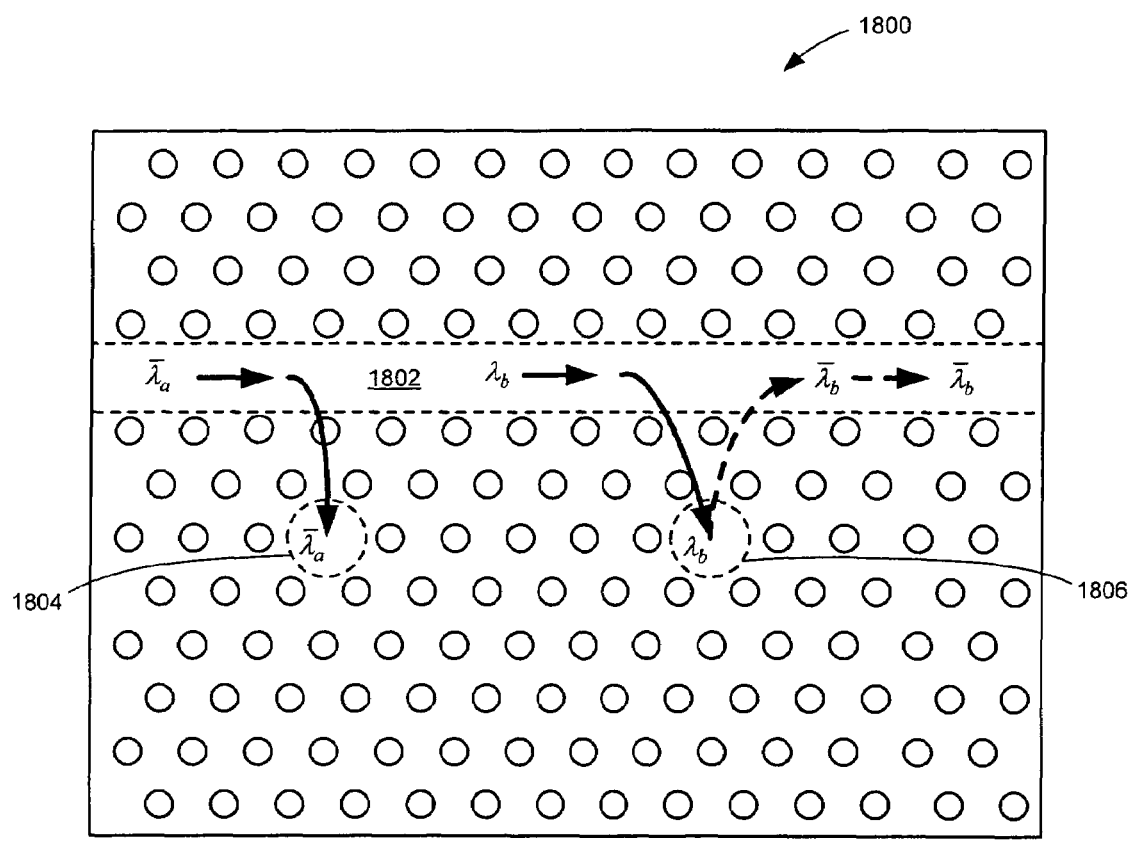
FIG. 18 illustrates a first photonic node that represents an embodiment of the present invention.

FIG. 18 illustrates a first example of a photonic node 1800 comprising a photonic decoder and a photonic encoder located next to a bus waveguide 1802 that represents an embodiment of the present invention. The decoder 1804 comprises a resonant cavity that extracts an encoded electromagnetic signal $\overline{\lambda_a}$ from the waveguide 1802 via evanescent coupling. The decoder 1804 operates as a demodulator, described below with reference to FIGS. 21A-21C, by converting fluctuations in the electric field component of the electromagnetic signal $\overline{\lambda_a}$ to an electrical signal that can be transmitted to a coupled memory chip. The decoder 1804 may also be operated as an "ON/OFF" switch by applying a voltage that shifts the refractive index of the resonant cavity away from the refractive index that is transparent to the electromagnetic signal $\overline{\lambda_a}$. In other words, the decoder 1804 may be turned "OFF," as described above with reference to FIG. 16. The encoder 1806 extracts the unencoded electromagnetic signal $\lambda_b$ from the waveguide 1802 via evanescent coupling. The encoder 1806 modulates the electric field component of the electromagnetic signal $\lambda_b$ to produce an encoded electromagnetic signal $\overline{\lambda_b}$, as described below with reference to FIGS. 21A-21C. The encoded electromagnetic signal $\overline{\lambda_b}$ is then introduced to the waveguide 1802 via evanescent coupling. The encoder 1806 may also be operated as an "ON/OFF" switch by applying a voltage that shifts the refractive index of the resonant cavity away from a refractive index that is transparent to the electromagnetic signal $\lambda_b$.

Figure 19:
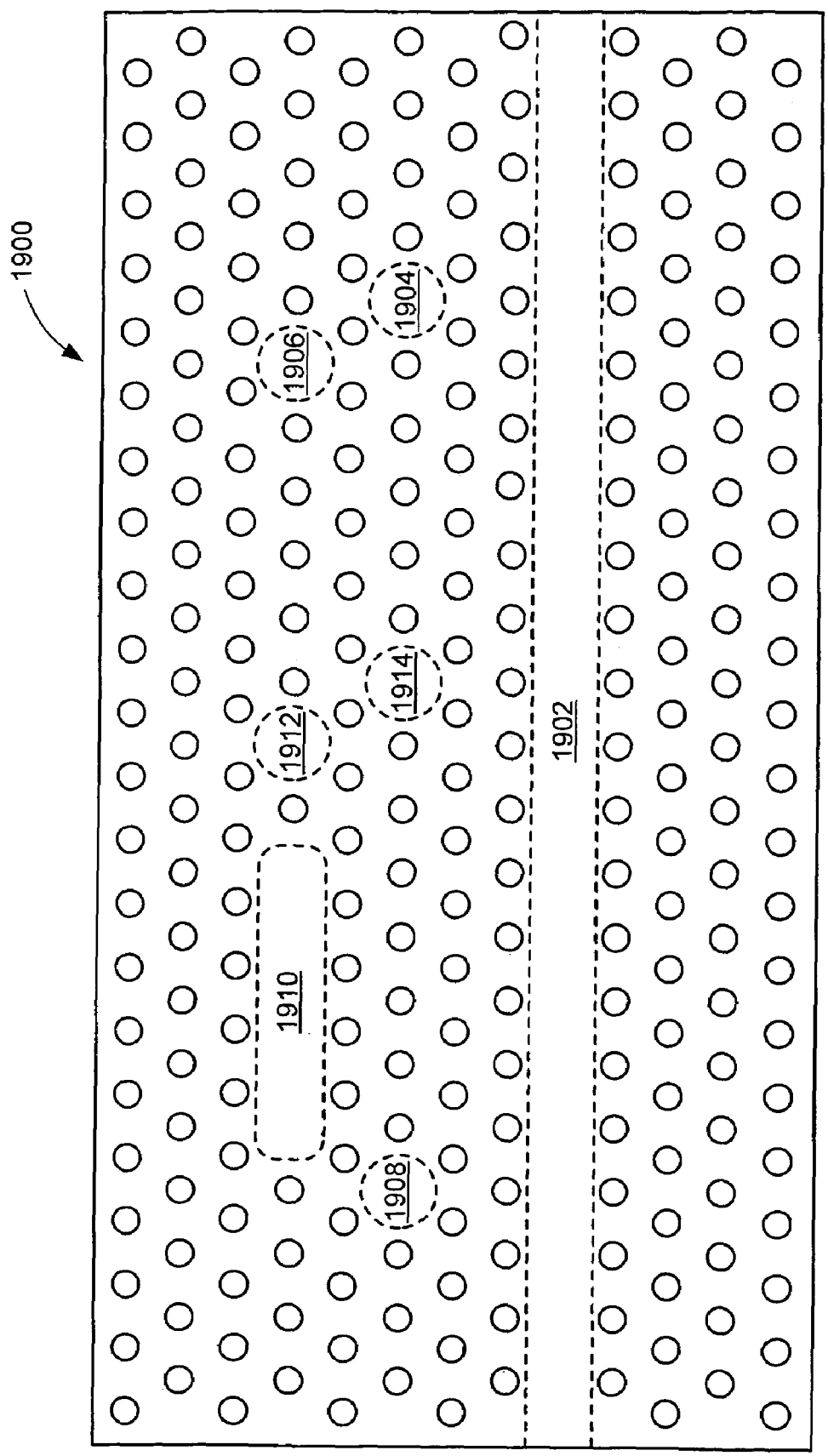
FIG. 19 illustrates a second photonic node that represents an embodiment of the present invention.

FIG. 19 illustrates a second photonic node 1900 comprising a single photonic decoder and a single photonic encoder located next to a bus waveguide 1902 that represents an embodiment of the present invention. The photonic decoder comprises a drop filter 1904 and a detector 1906. The photonic encoder includes a drop filter 1908, a local waveguide 1910, a modulator 1912, and an add filter 1914. Note that the photonic node 1900 can be used to reduce the signal-to-noise ratio.

Figure 20:
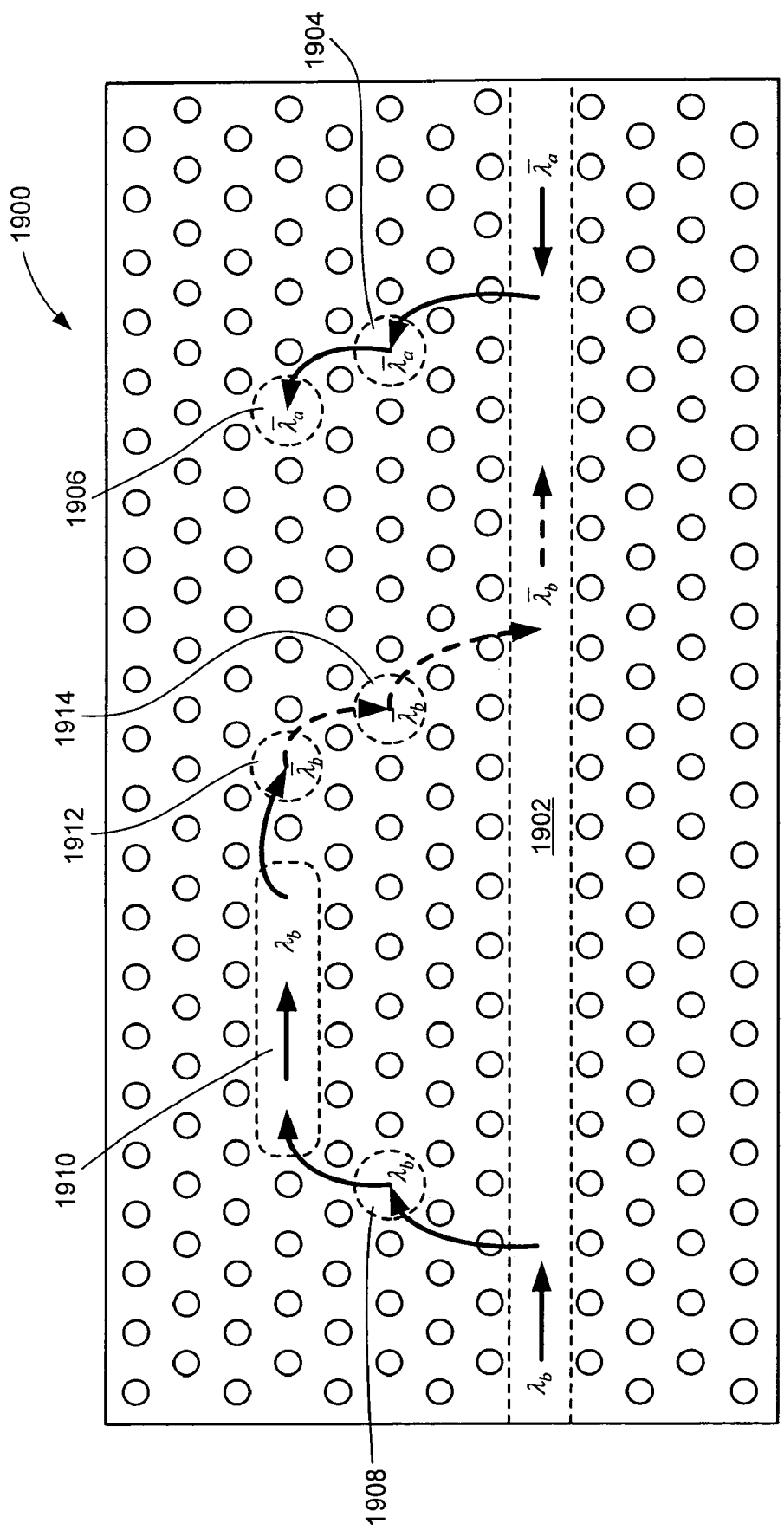
FIG. 20 illustrates operation of the second photonic node that represents an embodiment of the present invention.
Figure 21A:
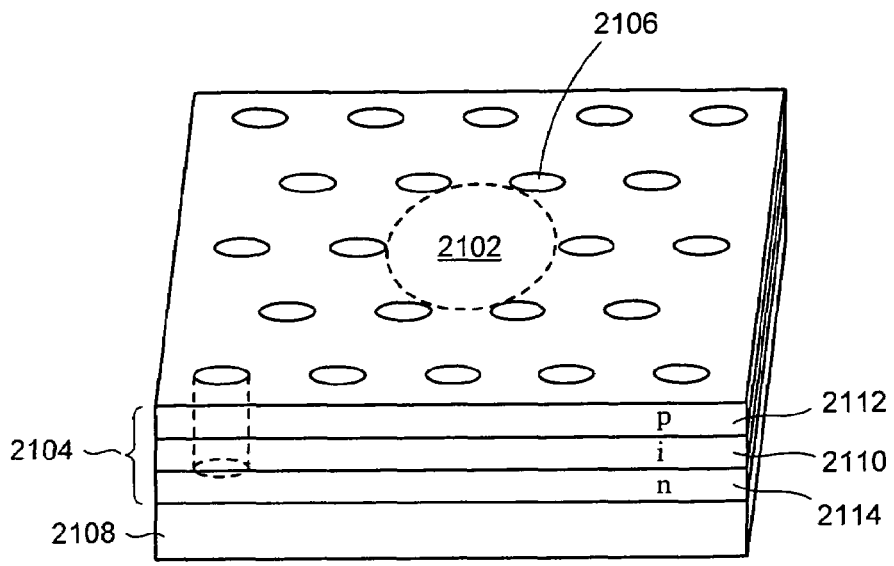
FIG. 21A illustrates a resonant cavity that can be used as either a drop filter or an add filter and that represents one of many embodiments of the present invention.
Figure 21B:
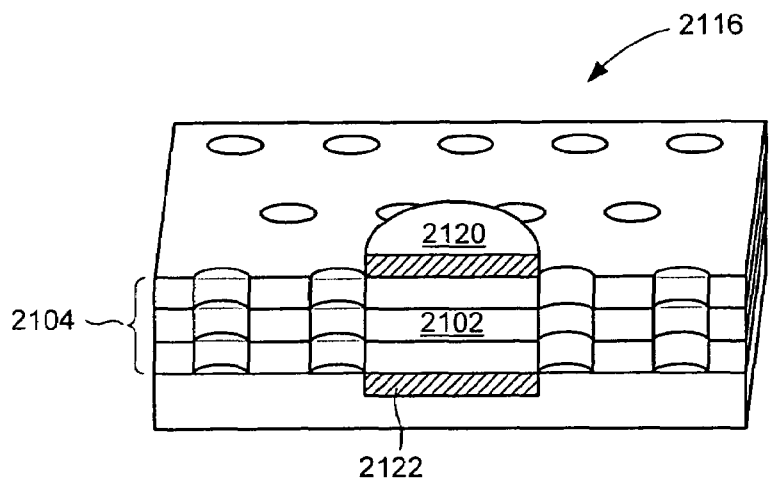
FIG. 21B illustrates a first configuration of a detector/modulator that represents one of many embodiments of the present invention.
Figure 21C:
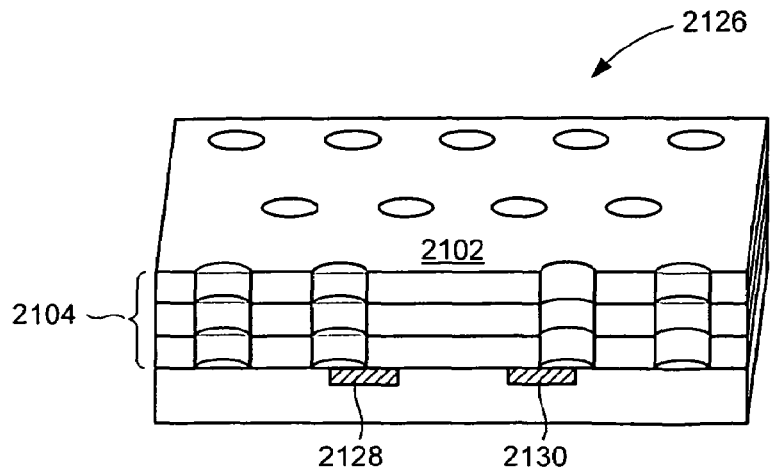
FIG. 21C illustrates a second configuration of a detector/modulator that represents one of many embodiments of the present invention.

FIG. 20 illustrates operation of the second photonic node 1900 for a hypothetically encoded electromagnetic signal $\overline{\lambda_a}$ and a hypothetically unencoded electromagnetic signal $\lambda_b$ that represents an embodiment of the present invention. The photonic decoder operates as follows. The drop filter 1904 is a resonant cavity that is configured to extract the encoded electromagnetic signal $\overline{\lambda_a}$ via evanescent coupling from the bus waveguide 1902. The encoded electromagnetic signal $\overline{\lambda_a}$ is transmitted via evanescent coupling from the drop filter 1904 into the demodulator 1906. The demodulator 1906, described below with reference to FIGS. 21A-21C, is a resonant cavity including photodetectors for detecting the data encoded in the electric field component of the encoded electromagnetic signal $\overline{\lambda_a}$. The photonic encoder operates as follows. The drop filter 1908 is a resonant cavity that is configured to extract the electromagnetic signal $\lambda_b$ via evanescent coupling from the bus waveguide 1902. The electromagnetic signal $\lambda_b$ is transmitted via evanescent coupling into the local waveguide 1910 and into the modulator 1912. The modulator 1912 is a resonant cavity, described below with reference to FIGS. 21A-21C, that generates a data encoded electromagnetic signal $\overline{\lambda_b}$ by modulating the electromagnetic signal $\lambda_b$ in accordance with the data received by a coupled electronic mosaic. The add filter 1914 is a resonant cavity that extracts the encoded electromagnetic signal $\overline{\lambda_b}$ via evanescent coupling from the modulator 1912 and introduces the encoded electromagnetic signal $\overline{\lambda_b}$ into the bus waveguide 1902. The drop filters 1904 and 1908 may also include electrodes so that the drop filters 1904 and 1908 can be operated as "ON/OFF" switches as described above with reference to FIG. 18.

In general, the drop filters and the add filters of photonic encoders and photonic decoders are positioned within a range of evanescent fields emanating from a waveguide. Both drop and add filter diameters and distances to the waveguide can be selected so that associated resonant cavities are resonators for specific wavelengths of electromagnetic signals carried by the waveguide. The dielectric constant of the photonic crystal slab, and the spacing and/or size of the lattice of cylindrical holes surrounding each resonator cavity can be selected so that the drop filters 1904 and 1908 can only extract certain electromagnetic signals. In order to provide strong couplings between a waveguide and drop and add filters, the resonant cavities can be fabricated with high Q factors, such as a Q factor of about 1,000 or larger. For example, the resonant cavities associated with the drop filters 1904 and 1908, shown in FIGS. 19-20, are dimensioned and positioned near the bus waveguide 1902 to extract and confine the electromagnetic signals $\overline{\lambda}_a$ and $\lambda_b$, respectively, and the add filter 1914 is dimensioned and located near the bus waveguide 1902 to introduce the encoded electromagnetic signal $\overline{\lambda}_b$ into the bus waveguide 1902. The local waveguide 1910, is located near the modulator 1912 so that a large fraction of the electromagnetic signal $\lambda_b$ can be transmitted via evanescent coupling into the resonant cavity of the modulator 1912. The modulator 1912 is also dimensioned and positioned to create a strong evanescent coupling with the add filter 1914.

Drop filters and add filters can be fabricated using a variety of different defects in a photonic crystal. FIG. 21A illustrates a resonant cavity that can be used as a resonant cavity for a drop filter, an add filter, a modulator, and a detector that represents one of many embodiments of the present invention. In FIG. 21A, a resonant cavity 2102 can be created by omitting a cylindrical hole within a regular triangular grid of cylindrical holes in a photonic crystal slab 2104. The diameter of the resonant cavity 2102 and the pattern and diameter of cylindrical holes surrounding the resonant cavity 2102, such as cylindrical hole 2106, can be selected to temporarily trap a specific electromagnetic signal with the resonant cavity 2102. A resonant cavity may also be fabricated using a cylindrical hole having a diameter that is different from the diameter of the surrounding cylindrical holes, and/or filling a cylindrical hole with a dielectric material different from the dielectric material of the photonic crystal. The photonic crystal slab 2104 is located on top of a glass substrate 2108 and may be comprised an intrinsic layer 2110 that is located between a positively doped semiconductor layer 2112 and a negatively doped semiconductor layer 2114. The layers 2110, 2112, and 2114 comprise a single photonic-crystal layer called a "p-i-n" layer. The dopant concentrations of the p-i-n layers can be any combination of Si, SiO, $SiO_2$, InGaAs, or any other suitable dopants.

Demodulators and modulators can be fabricated at resonant cavities from a variety of different materials. FIG. 21B illustrates a first configuration of a demodulator/modulator that represents one of many embodiments of the present invention. A demodulator/modulator 2116 can be fabricated using a resonant cavity, such as the resonant cavity 2102, sandwiched between two electrodes 2120 and 2122. The layer 2104 can be comprised of the p-i-n layers, described above with reference to FIG. 21A, or a single layer, such as a single semiconductor layer of lithium niobate, $LiNbO_3$. The electrode 2120 is in contact with the semiconductor layer 2112, and the electrode 2122 is in contact with the semiconductor layer 2114. In order for the demodulator/modulator 2116 to operate as a demodulator, the electrodes 2120 and 2122 collect a varying electrical current generated by variations in the intensity, phase, and/or amplitude of the electric field component of an electromagnetic signal resonating in the resonant cavity 2102. The varying electrical current represents a data stream that can be transmitted from the electrodes 2120 and 2122 to a coupled electronic mosaic. The semiconductor layers 2112 and 2114 may have different dopant concentrations or dopant types so that the demodulator/modulator 2116 can be operated as a modulator for encoding data in an electromagnetic signal. By varying a voltage across the resonant cavity 2102 the frequency or amplitude of the electric field component of an electromagnetic signal resonating in the resonant cavity 2102 is changed to encode the data.

FIG. 21C illustrates a second configuration of a demodulator/modulator that represents one of many embodiments of the present invention. Demodulator/modulator 2126 includes the resonant cavity 2102 and two electrodes 2128 and 2130 that are both located under the resonant cavity 2102. The layer 2104 can be comprised of the p-i-n layers, described above with reference to FIG. 21A, or a single semiconductor layer, such as a single layer of lithium niobate, $LiNbO_3$. The demodulator/modulator 2126 operates as a demodulator by detecting variations at the electrodes 2128 and 2130 in the intensity, phase, and/or amplitude of the electric field component of an electromagnetic signal resonating in the resonant cavity 2102. The demodulator/modulator 2126 operates as a modulator by varying a voltage applied to the electrodes 2128 and 2130 that, in turn, changes the dielectric constant of the dielectric materials in the resonant cavity 2102 causing a phase and/or amplitude change in the electric field component of an electromagnetic signal resonating in the resonant cavity 2102.

The intrinsic capacitance in demodulator electrode detectors is often low enough that fluctuations in current due to noise generated by thermal agitation of electrons in a conductor, called "Johnson noise," may be insignificant. As a result, statistics associated with an electromagnetic signal source dominate the bit error rate ("BER") arising in the serial digital signal corresponding to the output from the detector. For example, a Poisson distribution of an electromagnetic signal having 30 photons per bit is sufficient to achieve a BER of less than $10^{-13}$. Incorporating a doped region into a resonant cavity with a Q factor of 10 to 100 may compensate for the reduced absorption. With an appropriate choice of Q factor to impedance-match, the optical input losses of the cavity to the internal absorption loss of the detector may increase detection efficiency. For example, an increase in the detection efficiency of about 50% may be achieved.

Similar considerations can be applied to the design of a resonant cavity enhanced ("RCE") modulator using electro-optic or current injection techniques. Modulation depths as high as 50% may be achieved for a resonant cavity with a Q factor greater than about 1,000. Although other physical effects can be employed, such as variations in the free carrier plasma index, electro-optic modulation can be used with a potential difference of about 30 mV applied across a gap of about 300 nm to produce an electric field of 1 kV/cm, which is sufficient to generate a refractive index change as large as 0.001 in a wide variety of linear dielectric materials.

Figure 22:
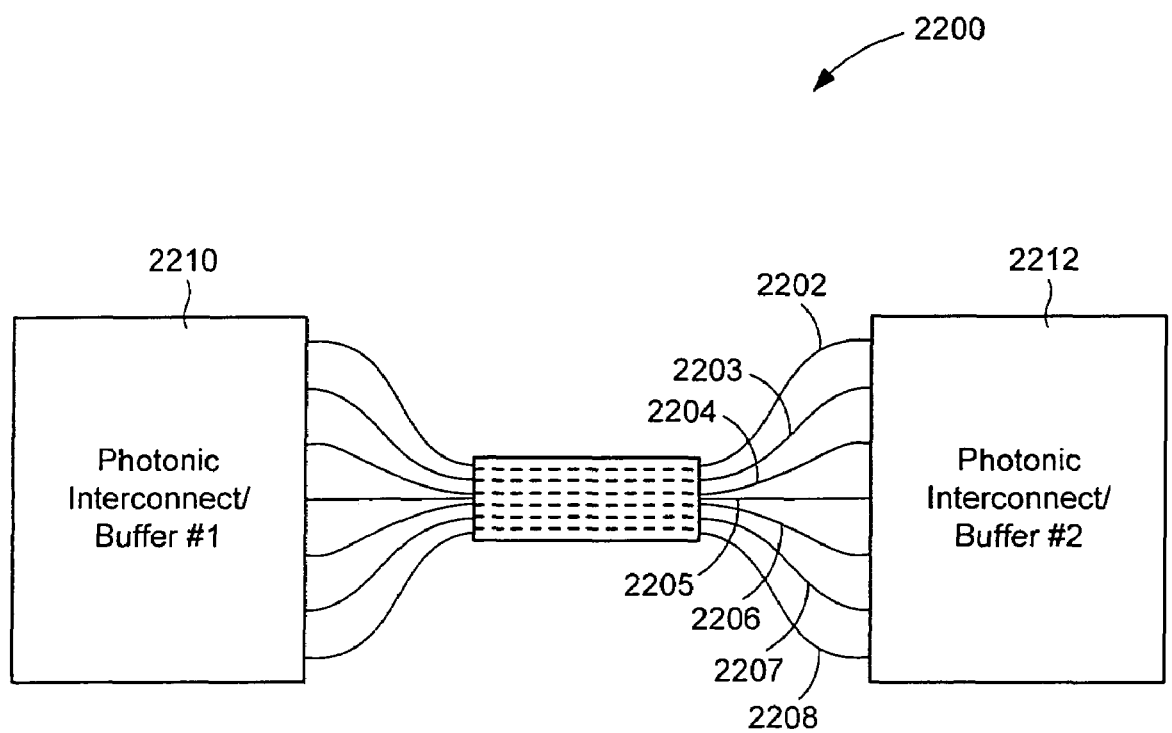
FIG. 22 illustrates a schematic representation of a second photonic-interconnect system that represents an embodiment of the present invention.

FIG. 22 illustrates a schematic representation of a second photonic-interconnect system 2200 that represents an embodiment of the present invention. The photonic-interconnect system 2200 comprises a number of optical fibers 2202-2208 connected to a first photonic interconnect 2210 and a second photonic interconnect 2212. The first and second photonic interconnects 2210 and 2212 may each be coupled to a different memory chip (not shown), as described above with reference to FIGS. 14-15. The optical fibers interconnect corresponding waveguides in the first and second photonic interconnects 2210 and 2212. The optical fibers 2202-2208 can be bundled and have lengths ranging from about 1 micron to ten of thousands of kilometers for interconnecting memory chips in different locations.

FIGS. 23A-23B illustrate example operations of the first photonic-interconnect system 1200 to read data from and write data to two memory chips that represents an embodiment of the present invention. FIG. 23A illustrates an overview of transmitting data-encoded electromagnetic signals from the second photonic interconnect 1208 to the first photonic interconnect 1206. As shown in FIG. 23A, a multi-channel laser 2302 transmits seven sets of the same six unencoded electromagnetic signals to the photonic interconnect 2212. Each electromagnetic signal is of a different wavelength represented by $\lambda_1$, $\lambda_2$, $\lambda_3$, $\lambda_4$, $\lambda_5$, and $\lambda_6$. As the electromagnetic signals are transmitted through the second photonic interconnect 2212, data stored in the memory cells (not shown) is encoded in the electromagnetic signals at approximately the same time, as described below with reference to FIG. 24A. The encoded electromagnetic signals are then transmitted over the waveguides 2202-2208 to the first photonic interconnect 2210. As the encoded electromagnetic signals propagate through the photonic interconnect 2210, the data is stored in the memory cells of a memory chip (not shown) which is coupled to the photonic interconnect 2210.

FIG. 23B illustrates an overview of transmitting data-encoded electromagnetic signals from the first photonic interconnect 2210 to the second photonic interconnect 2212, which is identical to the operation described with reference to FIG. 23A. Therefore, for the sake of brevity, a description of the operation illustrated in FIG. 23B is not included.

Figure 24A:
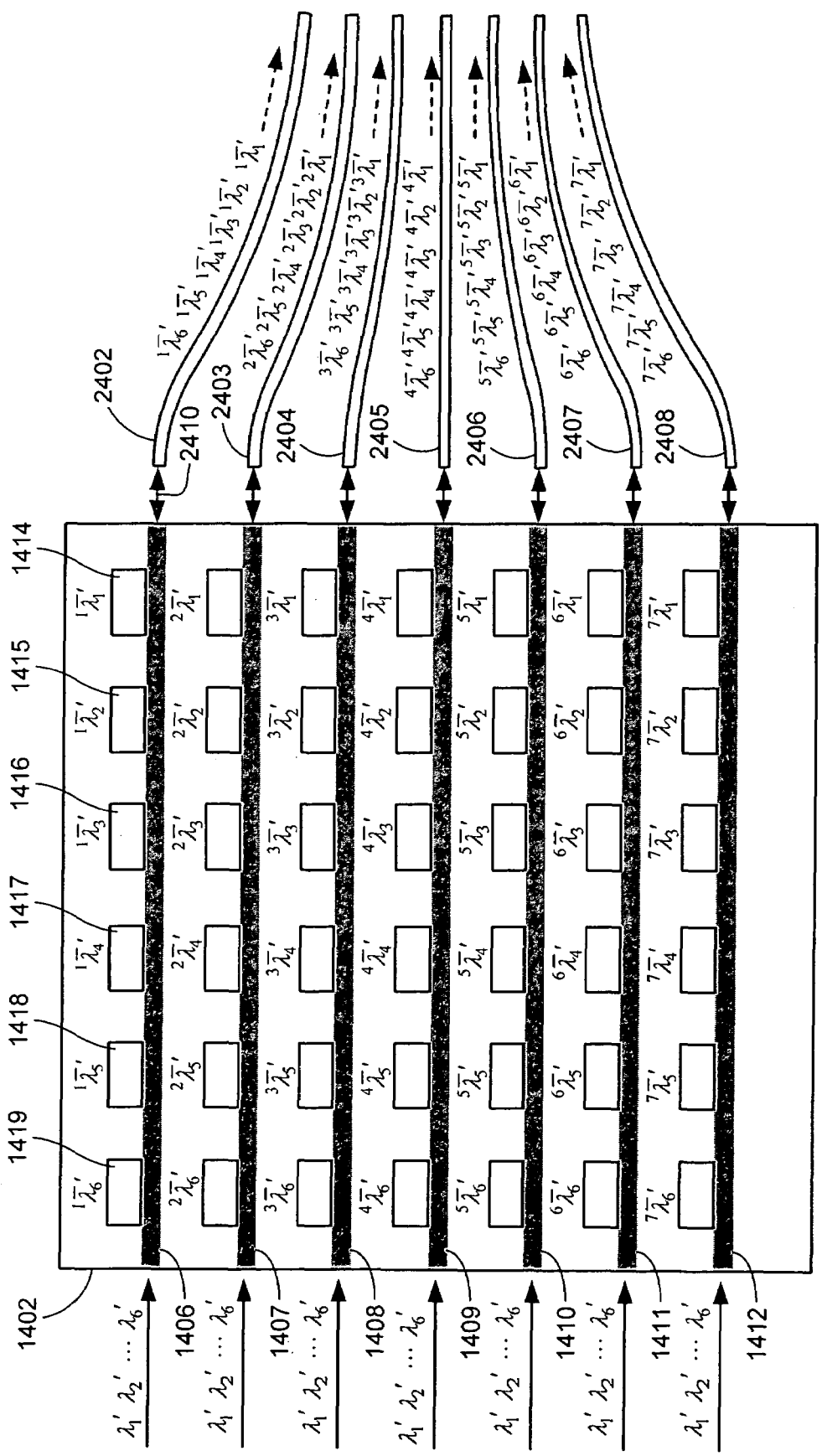

FIGS. 24A-24B illustrates a top-view of a second kind of photonic interconnect 1402 coupled to seven optical fibers 2402-2408 that represents an embodiment of the present invention. As shown in both FIGS. 24A-24B, the waveguides 1406-1412 are coupled to the optical fibers 2402-2408 via fiber-to-photonic waveguide couplers, such as fiber-to-photonic waveguide coupler 2410, which are described below with reference to FIG. 25.

FIG. 24A illustrates encoding data in unencoded electromagnetic signals that represents an embodiment of the present invention. As shown in FIG. 24A, six unencoded electromagnetic signals of wavelengths $\lambda'$, $\lambda_2'$, $\lambda_3'$, $\lambda_4'$, $\lambda_5'$, and $\lambda_6'$, are input to each of the waveguides 1406-1412 from a multi-channel laser (not shown). As shown in FIG. 24A, the same six unencoded electromagnetic signals propagate through the waveguides 1406-1412, each of the photonic nodes extract one of the six signals and encodes data released by a couple memory chip. For example, the photonic nodes 1414-1419 extract and encode data in the unencoded electromagnetic signals $\lambda_1'$, $\lambda_2'$, $\lambda_3'$, $\lambda_4'$, $\lambda_5'$, and $\lambda_6'$, respectively, to give encoded electromagnetic signals $^1\overline{\lambda_1'}$, $^1\overline{\lambda_2'}$, $^1\overline{\lambda_3'}$, $^1\overline{\lambda_4'}$, $^1\overline{\lambda_5'}$, and $^1\overline{\lambda_6'}$, where the superscript identifies the associated row of photonic nodes. The encoded electromagnetic signals are output from each waveguide, coupled into optical fibers 2402-2408, and transmitted.

FIG. 24B illustrates decoding data in unencoded electromagnetic signals that represents an embodiment of the present invention. As shown in FIG. 24B, each of the optical fibers 2402-2408 transmits six different encoded electromagnetic signals may be output from an other memory chip (not shown). As the encoded electromagnetic signals propagate through each the waveguides 1406-1412, each of the six photonic nodes extracts a corresponding encoded electromagnetic signal and transmits the data to a coupled memory chip (not shown). For example, the photonic nodes 1414-1419 extract and the encoded electromagnetic signals $^1\overline{\lambda_1}$, $^1\overline{\lambda_2}$, $^1\overline{\lambda_3}$, $^1\overline{\lambda_4}$, $^1\overline{\lambda_5}$, and $^1\overline{\lambda_6}$, respectively.

Figure 25:
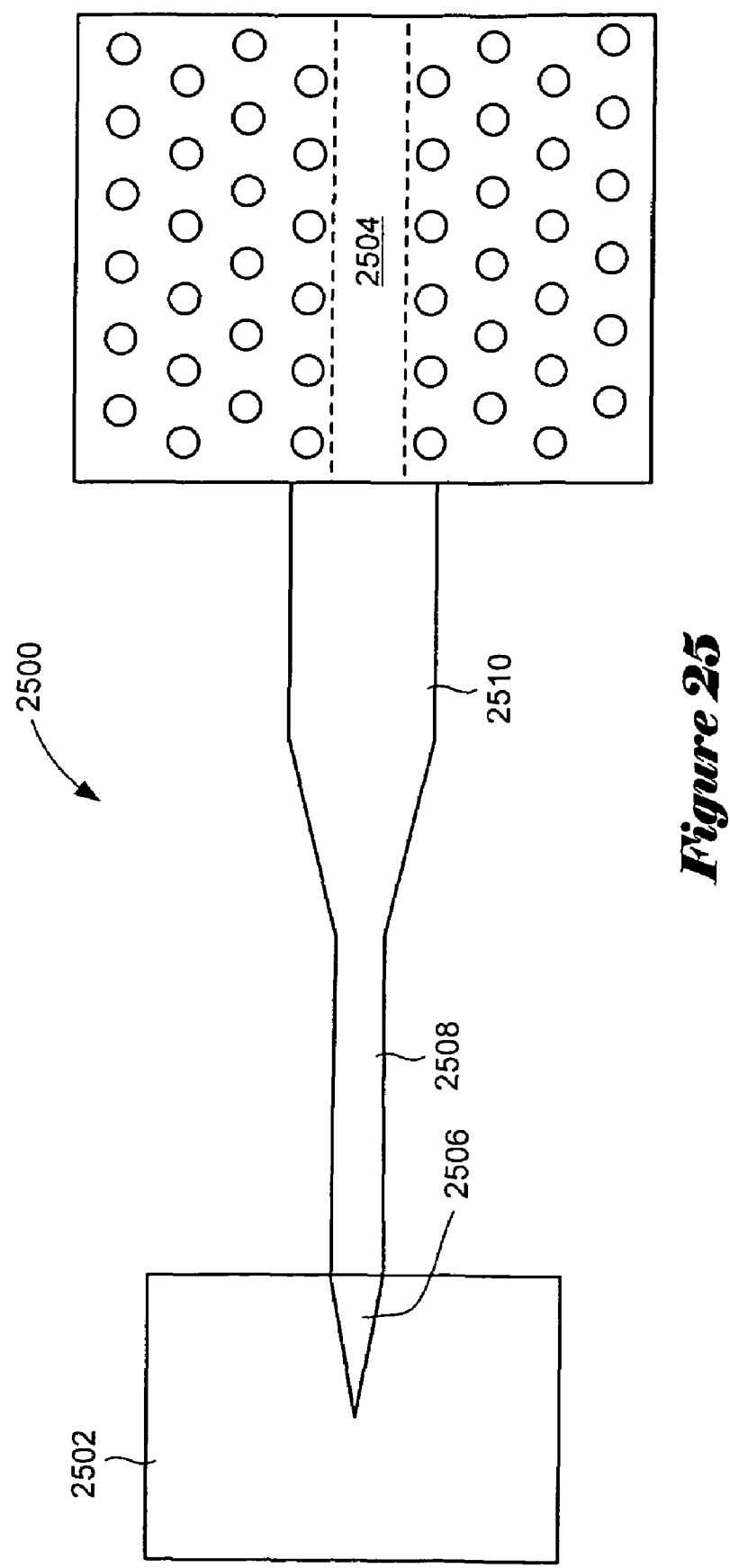
FIG. 25 illustrates an optical fiber-to-waveguide coupler.

FIG. 25 illustrates an optical fiber-to-waveguide coupler 2500 that couples an optical fiber 2502 to a waveguide 2504. The fiber-to-waveguide coupler 2500 comprises a tapered end 2506 embedded in the end of the optical fiber 2502. The fiber-to-waveguide coupler 2500 that widens to a single-mode strip waveguide 2508 and then widens again into a butt coupler 2510, which abuts the waveguide 2504. The refractive index of the coupler 2500 is higher than the refractive index than the optical fiber 2502. As a result, electromagnetic signals propagating in the optical fiber 2502 may be evanescently coupled into or out of the fiber-to-waveguide coupler 2500 at the tapered end 2506. The fiber-to-waveguide coupler 2500 can be supported by a transparent material, such as $SiO_2$. See e.g., "Ultra-low loss photonic integrated circuit with membrane-type waveguides," by S. J. McNab et al., Optics Express 2927, Vol. 11, No. 22, Nov. 3, 2003.

Although the present invention has been described in terms of particular embodiments, it is not intended that the invention be limited to these embodiments. Modifications within the spirit of the invention will be apparent to those skilled in the art. In an alternate embodiment of the present invention, those skilled in the art would recognize that the photonic nodes of the photonic interconnect shown in FIG. 24 could be configured to encode data in fewer numbers of unencoded electromagnetic signals. For example, the same three unencoded electromagnetic signals could be input to each of the waveguides 1406-1412. FIG. 26 illustrates writing data in unencoded electromagnetic signals that represents an embodiment of the present invention. As shown in FIG. 26, three unencoded electromagnetic signals of wavelengths $\lambda_1'$, $\lambda_2'$, are $\lambda_3'$ are input to each of the waveguides 1406-1412 from a multi-channel laser (not shown). As shown in FIG. 26, the same three unencoded electromagnetic signals propagate through each the waveguides 1406-1412, a first pair of photonic nodes extract the signal $\lambda_1'$, a second pair of the photonic nodes extract the signal $\lambda_2'$, and a third pair of the photonic nodes extract the signal $\lambda_3'$. For example, the photonic nodes 1414 and 1417 extract the signal $\lambda_1'$, the photonic nodes 1415 and 1418 extract the signal $\lambda_2'$, and the photonic nodes 1416 and 1419 extract the signal $\lambda_3'$. The photonic nodes 1414-1419 then encode data output from coupled memory chips and transmit the encoded electromagnetic signal to the coupled optical fibers 2402-2408. For example, the encoded electromagnetic signals $_1{}^1\overline{\lambda_1}$, $_2{}^1\overline{\lambda_1}$, $_3{}^1\overline{\lambda_1}$, $_4{}^1\overline{\lambda_1}$, $_5{}^1\overline{\lambda_1}$, and $_6{}^1\overline{\lambda_1}$ are transmitted to the optical fiber 2402, where the upper-left superscripts corresponds to the row and the lower-left subscript corresponds to the photonic node. In alternate embodiments of the present invention, the photonic interconnect system can incorporated in video and image devices for transmitting video and image data between memory chips. In alternate embodiments of the present invention, multi-channel lasers that can be embedded in photonic interconnects. See e.g., "Electrically pumped hybrid AlGaInAs-silicon evanescent laser," by A. W. Fang et al., Optics Express 9203, Vol. 14, No. 20, Oct. 2, 2006.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A photonic-interconnect system for reading data from, and writing data to, a number of memory cells of a memory chip at approximately the same time, the system comprising:

a photonic interconnect coupled to the memory chip and configured so that each subset of memory cells of the memory chip is associated with one wavelength of a first set of electromagnetic signals for encoding data and one wavelength of a second set of electromagnetic signals for receiving data, wherein the subsets of memory cells encode data in the associated electromagnetic signals of the first set at approximately the same time, and the subsets of memory cells receive and store data encoded in the associated electromagnetic signals of the second set at approximately the same time; and a photonic device coupled to the photonic interconnect and configured to transmit the first set of electromagnetic signals out from the photonic interconnect and transmit the second set of electromagnetic signals into the photonic interconnect.

2. The system of claim 1 wherein the memory chip further comprises random access memory.

3. The system of claim 1 wherein the photonic interconnect further comprises one of:
 a photonic crystal with photonic crystal waveguides; and
 a photonic crystal with ridge waveguides and microrings.

4. The system of claim 3 wherein the photonic interconnect further comprise one or more photonic nodes coupled to waveguides.

5. The system of claim 4 wherein the photonic nodes further comprise one or more encoders and one or more decoders.

6. The system of claim 1 wherein the photonic device further comprises a photonic crystal-based multiplexer/demultiplexer with waveguides coupled to waveguides in the photonic interconnect.

7. The system of claim 1 wherein the photonic device further comprises a number of optical fibers, each optical fiber includes a first end coupled to a waveguide of the photonic interconnect.

8. The system of claim 1 wherein the first set of electromagnetic signals are generated by a first multi-channel laser configured to transmit the first set of electromagnetic signals to the photonic interconnect, and the second set of electromagnetic signals are generated by a second multi-channel laser configured to transmit the second set of electromagnetic signals to the second photonic interconnect.

9. The system of claim 1 for transmitting video and image data between electronic devices.

\* \* \* \* \*